(12) United States Patent
Nishimura

(10) Patent No.: US 8,059,950 B2
(45) Date of Patent: Nov. 15, 2011

(54) IMAGE STABILIZING APPARATUS, LENS APPARATUS, IMAGING APPARATUS, AND CORRECTION OPTICAL APPARATUS

(75) Inventor: Fumiyoshi Nishimura, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 2 days.

(21) Appl. No.: 12/647,814

(22) Filed: Dec. 28, 2009

(65) Prior Publication Data

US 2011/0026908 A1    Feb. 3, 2011

(30) Foreign Application Priority Data

Jul. 28, 2009   (JP) ................................. 2009-175769
Jul. 28, 2009   (JP) ................................. 2009-175770

(51) Int. Cl.
*G03B 17/00*  (2006.01)

(52) U.S. Cl. ......................................... 396/55; 359/557

(58) Field of Classification Search .................... 396/52, 396/55, 439; 359/557; 348/208.99
See application file for complete search history.

(56) References Cited

U.S. PATENT DOCUMENTS

| | | | |
|---|---|---|---|
| 5,117,246 A | | 5/1992 | Takahashi et al. |
| 5,842,052 A | * | 11/1998 | Okano ............................ 396/55 |
| 6,191,813 B1 | * | 2/2001 | Fujisaki et al. ............ 348/208.8 |
| 6,738,571 B2 | * | 5/2004 | Takeda .............................. 396/55 |
| 6,819,503 B2 | * | 11/2004 | Katagishi et al. ............. 359/702 |
| 6,970,305 B2 | * | 11/2005 | Katagishi et al. ............. 359/702 |

FOREIGN PATENT DOCUMENTS

| | | |
|---|---|---|
| JP | 3192414 B2 | 5/2001 |
| JP | 2002-107785 A | 4/2002 |
| JP | 2002-156695 A | 5/2002 |
| JP | 3397536 B2 | 2/2003 |
| JP | 2008-185677 A | 8/2008 |

* cited by examiner

*Primary Examiner* — Clayton E Laballe
*Assistant Examiner* — Warren Fenwick
(74) *Attorney, Agent, or Firm* — Foley & Lardner LLP

(57) ABSTRACT

An image stabilizing apparatus includes a movable vibration-correcting lens constituting a part of an optical system and movable along a direction orthogonal to an optical axis; a locking unit that fixes the movable vibration-correcting lens at a neutral position substantially coinciding with the optical axis of the optical system; an actuating unit that switches between a locked state where the movable vibration-correcting lens is fixed by the locking unit and an unlocked state where the locked state of the movable vibration-correcting lens is released. The locking unit includes retaining members having a retaining unit sandwiching the movable vibration-correcting lens and arranged to slide along the direction orthogonal to the optical axis; and the actuating unit switches between the locked state and the unlocked state by moving the retaining members in opposing directions.

14 Claims, 20 Drawing Sheets

IMAGE STABILIZING APPARATUS, LENS APPARATUS, IMAGING APPARATUS, AND CORRECTION OPTICAL APPARATUS

CROSS-REFERENCE TO RELATED APPLICATIONS

The present document incorporates by reference the entire contents of Japanese priority documents, 2009-175769 and 2009-175770 filed in Japan on Jul. 28, 2009.

BACKGROUND OF THE INVENTION

1. Field of the Invention

The present invention relates to an image stabilizing apparatus, an imaging apparatus, a correction optical apparatus, and anti-vibration correction control.

2. Description of the Related Art

Conventionally, optical apparatuses, such as lens apparatuses performing anti-vibration correction control and imaging apparatuses equipped with such a lens apparatus have been disclosed in which vibration induced in the lens barrel by user hand-shake is detected and based on the detected vibration, an appropriate anti-vibration correction lens is moved to cancel out image blur resulting from the vibration. Such anti-vibration correction control is performed by moving an anti-vibration correction lens in a plane orthogonal to the optical axis.

For optical apparatuses performing such anti-vibration correction control, the optical performance of the anti-vibration correction lens is verified prior to use. The optical performance of the anti-vibration correction lens is verified by applying an electrical current to an optical apparatus in which the anti-vibration correction lens is in an assembled state and maintained at a neutral position.

Among optical apparatuses performing anti-vibration correction control, an example of a conventional technology that is able to prevent damage from collision of the movable correction optical unit with a movable end when carried with the power off and that appropriately resumes image stabilization operation includes a movable correction optical unit constituting a part of an optical system for correcting image blur, a fixing unit that by rotating about the optical axis, fixes the movable correction optical unit at a movable central position on the optical axis of the optical system, and an actuating unit that in response to powering off, rotates the fixing unit and fixes the movable correction optical unit (see, for example, Japanese Patent Publication No. 3192414).

Further among optical apparatuses performing anti-vibration correction control, an example of a conventional technology that is able to stably latch a correcting unit that decenters the optical axis further includes a retaining unit that latches and releases the correcting unit by rotating about the optical axis. The retaining unit has a cam unit abutting the correcting unit to latch the correcting unit at a latching position. The disclosed technology further includes an elastic unit pushing the retaining unit in the latching direction of the correcting unit. The cam unit of the retaining unit has a shape that when the cam unit is rotated in the latching direction by the elastic unit, the latching operation is not performed until after a given rotation range has been exceeded at the beginning of rotation in the latching direction (see, for example, Japanese Patent Publication No. 3397536).

Yet another example of an optical apparatus that performs anti-vibration correction control includes a lens frame, a support mechanism, a detecting unit, an actuator, an actuator drive unit, a retaining member, and a pushing unit, and has a configuration that includes a locking mechanism that switches between a locked state in which the retaining member latches the lens frame thereby making the lens frame immovable and an unlocked state in which the retaining member releases the lens frame thereby releasing the locked state. Thus, the imaging apparatus is not affected by vibrations or impact, facilitating improved durability of the imaging apparatus (see, for example, Japanese Patent Application Laid-Open Publication No. 2008-185677).

Conventionally, optical apparatuses, such as lens apparatuses performing anti-vibration correction control and imaging apparatuses equipped with such a lens apparatus have been disclosed, in which vibration induced in the lens barrel by user hand-shake is detected and based on the detected vibration, an appropriate anti-vibration correction lens is moved to cancel out the image blur resulting from the vibration. Such anti-vibration correction control is performed by moving an anti-vibration correction lens in a plane orthogonal to the optical axis.

In such optical apparatuses performing anti-vibration correction control, conventionally, for example, a movable lens that is moved to correct image blur occurring as a result of vibration sustained by the camera is stored in a main casing forming the external body of an anti-vibration adapter that is disposed between a lens apparatus and a camera; to transmit light entering through the lens apparatus from an object, apertures are formed along the direction of the optical axis of the movable lens, in an anterior aspect of the main casing facing the lens apparatus and a posterior aspect of the main casing facing the camera; and a first lens is disposed in the aperture formed in the anterior aspect and a second lens is disposed in the aperture formed in the posterior aspect, making the interior of the main casing hermetic(see, for example, Japanese Patent Application Laid-Open Publication No. 2002-107785).

A further example of an optical apparatus that performs anti-vibration correction control includes an anti-vibration adapter between a camera and a lens apparatus, where a lens connecting unit identical to a lens connecting structure formed on the camera is formed on an anterior aspect of the anti-vibration adapter connected to the lens apparatus, and a camera connecting unit identical to a camera connecting structure formed on the lens apparatus is formed on a posterior aspect of the anti-vibration adapter connected to the camera (see, for example, Japanese Patent Application Laid-Open Publication No. 2002-156695).

However, the conventional technologies disclosed in Japanese Patent Publication No. 3192414 and Japanese Patent Publication No. 3397536 have a configuration in which the anti-vibration correction lens is held at a neutral position by rotating a ring-shaped member (fixing unit, retaining unit) about the optical axis, making the ring-shaped member an essential element in the configuration. Consequently, a problem arises in that the number of elements increases, thereby increasing the size and manufacturing cost of the optical apparatus.

Further, with the conventional technologies above, when the optical performance of the anti-vibration correction lens is confirmed, to put the anti-vibration correction lens in a locked state in which the anti-vibration correction lens is maintained at a neutral position and in an unlocked stated releasing the locked state, for example, an electrical current is applied to an optical apparatus equipped with the anti-vibration correction lens to electrically switch between the states. Consequently, for these technologies, the application of an electrical current is essential in verifying the optical performance of the anti-vibration correction lens and to apply the electrical current, the anti-vibration correction lens is disposed in the optical apparatus and a circuit for moving the anti-vibration correction lens to a neutral position is required, arising in a problem of burdensome work.

The technology disclosed in Japanese Patent Application Laid-Open Publication No. 2008-185677 has a problem in that the anti-vibration correction lens cannot be maintained at a neutral position and thus, the optical performance of the anti-vibration correction lens cannot be confirmed.

The technologies disclosed in Japanese Patent Application Laid-Open Publication No. 2002-107785 and Japanese Patent Application Laid-Open Publication No. 2002-156695 have a configuration in which an anti-vibration adapter is housed in a main casing, thereby hindering size reductions of the anti-vibration adapter and thus, hindering size reductions of optical apparatuses equipped with such anti-vibration adapters.

SUMMARY OF THE INVENTION

It is an object of the present invention to at least solve the above problems in the conventional technologies.

An image stabilizing apparatus according to one aspect of the invention includes a movable vibration-correcting lens (image-shake correcting lens) constituting a part of an optical system and movable along a direction orthogonal to an optical axis; a locking unit that fixes the movable vibration-correcting lens at a position (neutral position) substantially coinciding with the optical axis of the optical system; an actuating unit that switches between a locked state where the movable vibration-correcting lens is fixed by the locking unit and an unlocked state where the locked state of the movable vibration-correcting lens is released. The locking unit includes retaining members having a retaining unit sandwiching the movable vibration-correcting lens and arranged to slide along the direction orthogonal to the optical axis; and the actuating unit switches between the locked state and the unlocked state by moving the retaining members in opposing directions.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
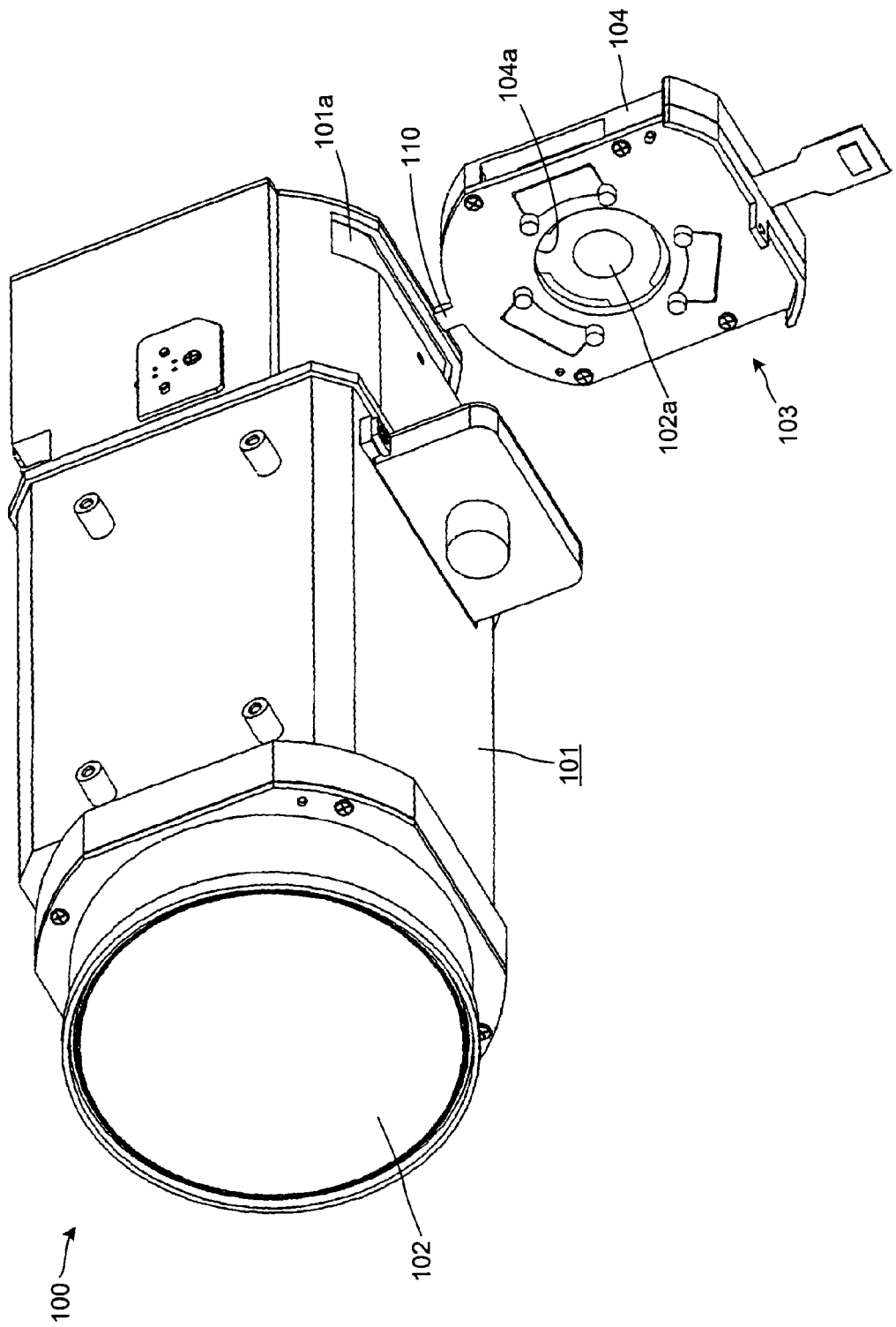
FIGS. 1 and 2 are schematics of a lens unit according to an embodiment of the present invention.
Figure 2:
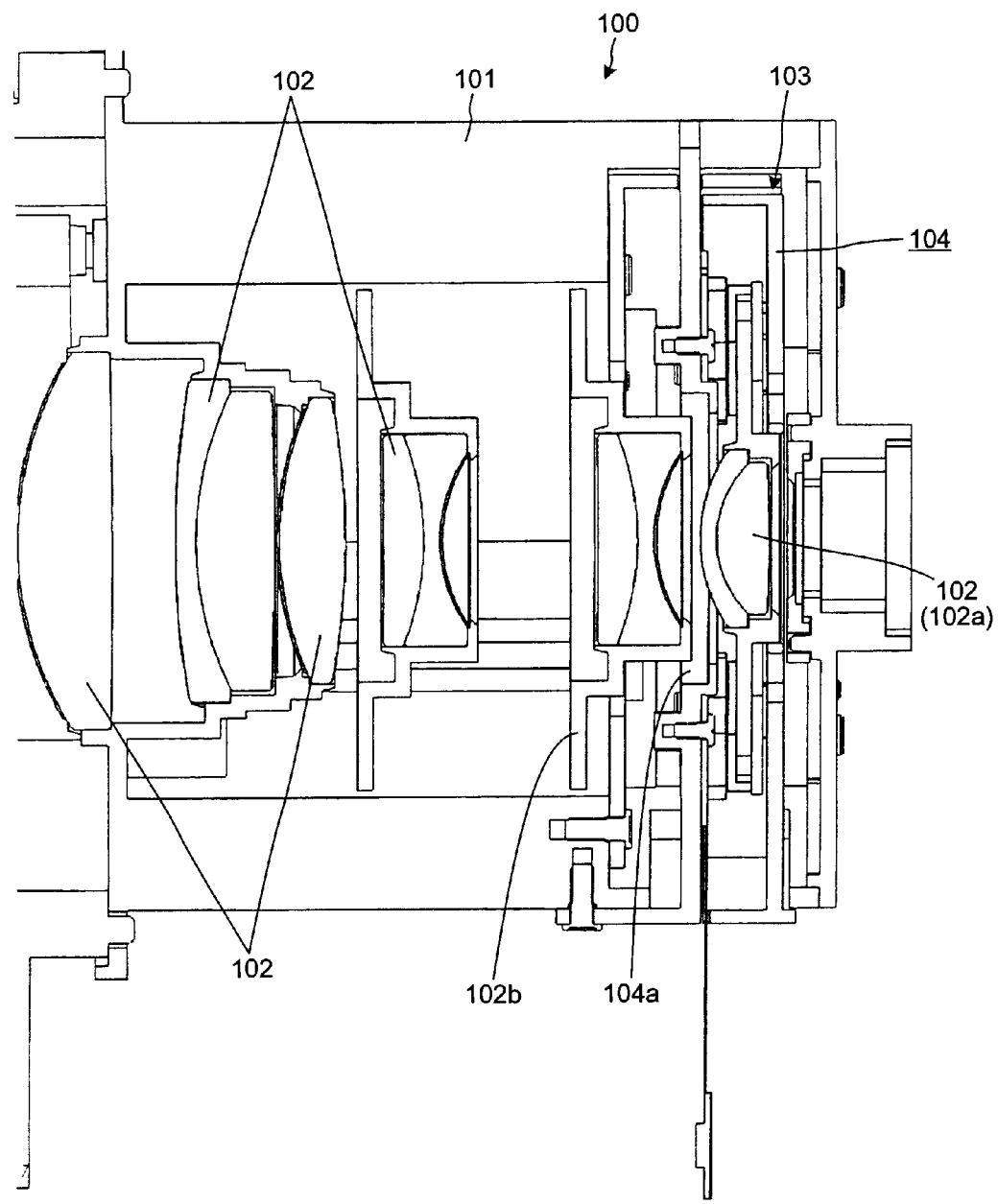
Figure 3:
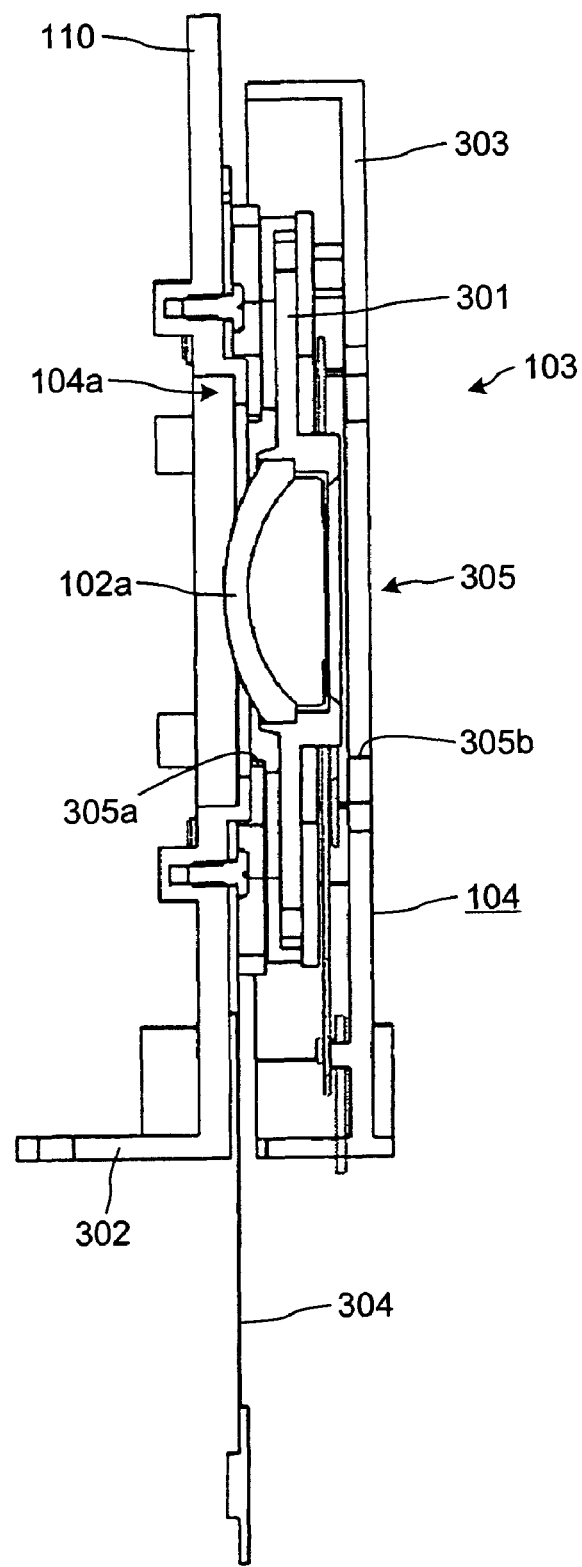
FIGS. 3 to 8 are schematics of an anti-vibration unit (image stabilizing unit)
Figure 4:
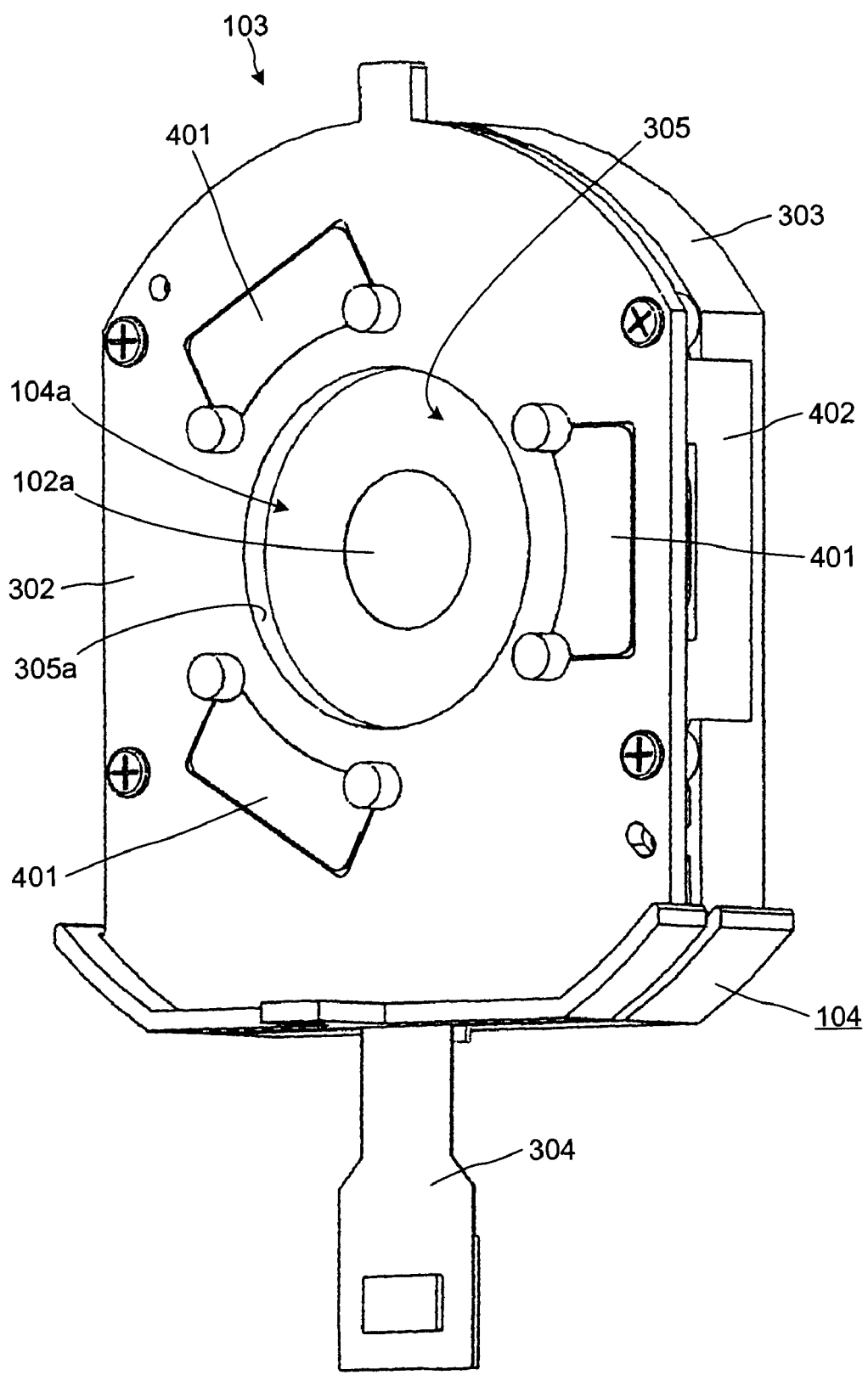
Figure 5:
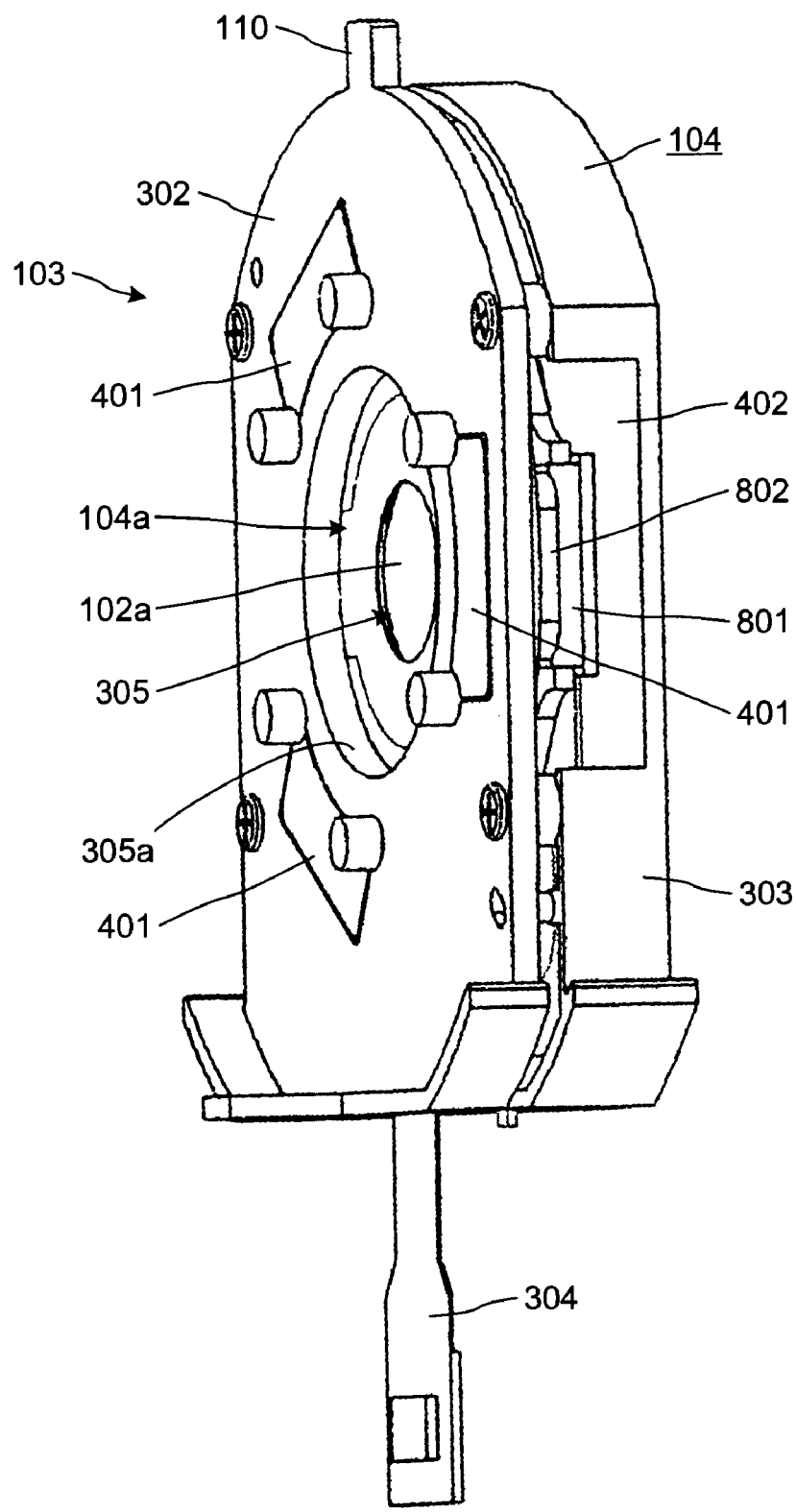
Figure 6:
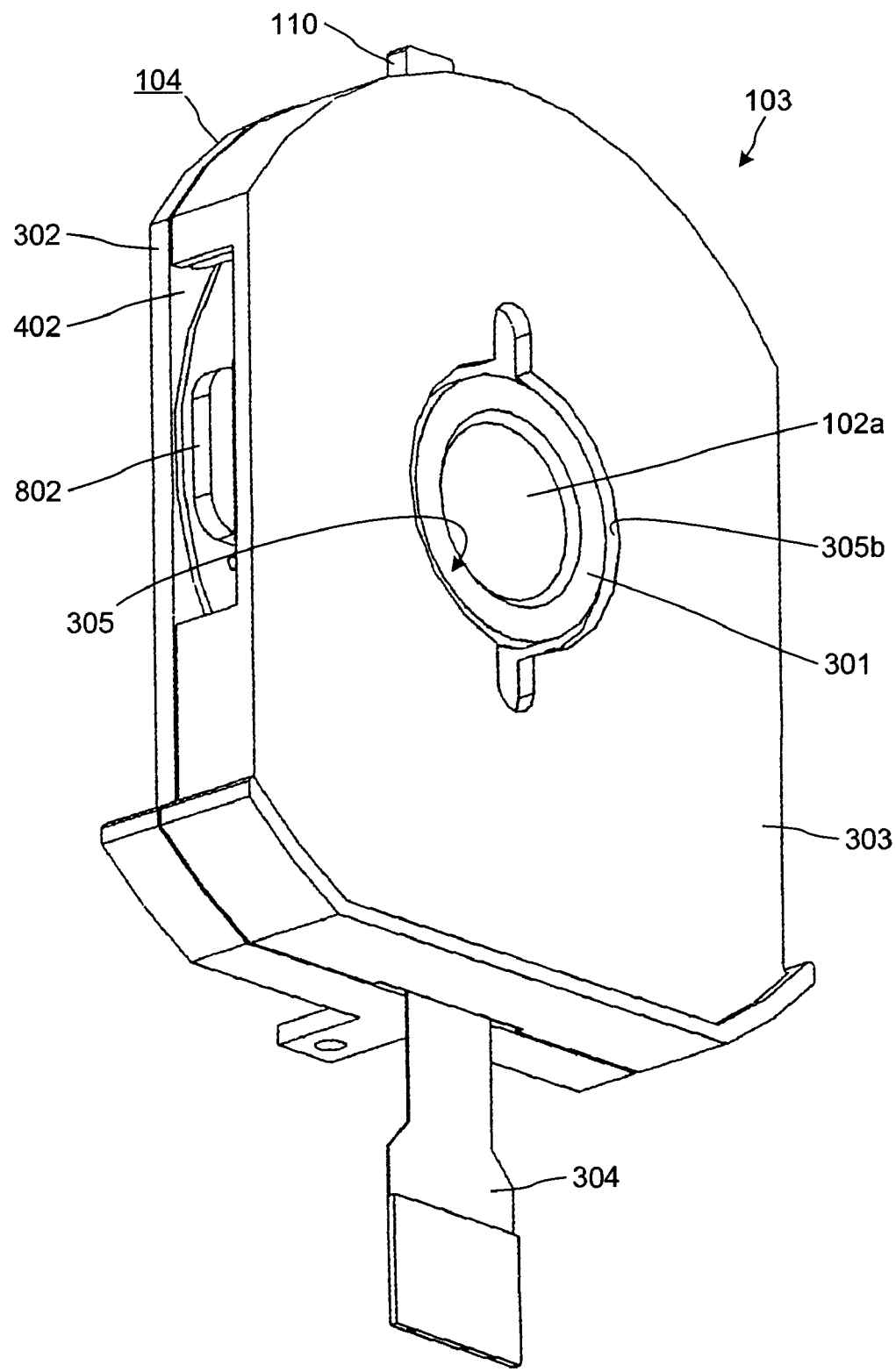
Figure 7:
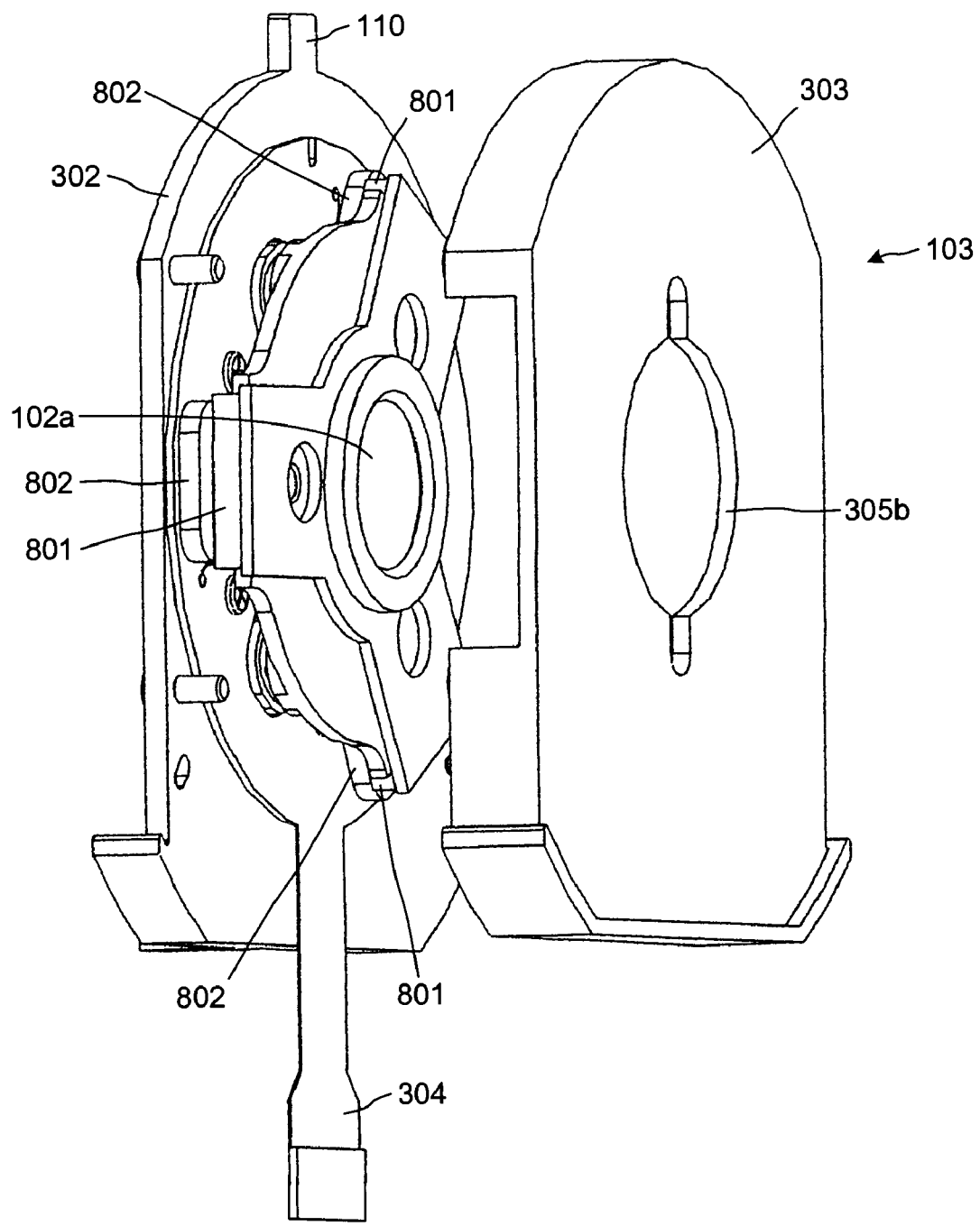
Figure 8:
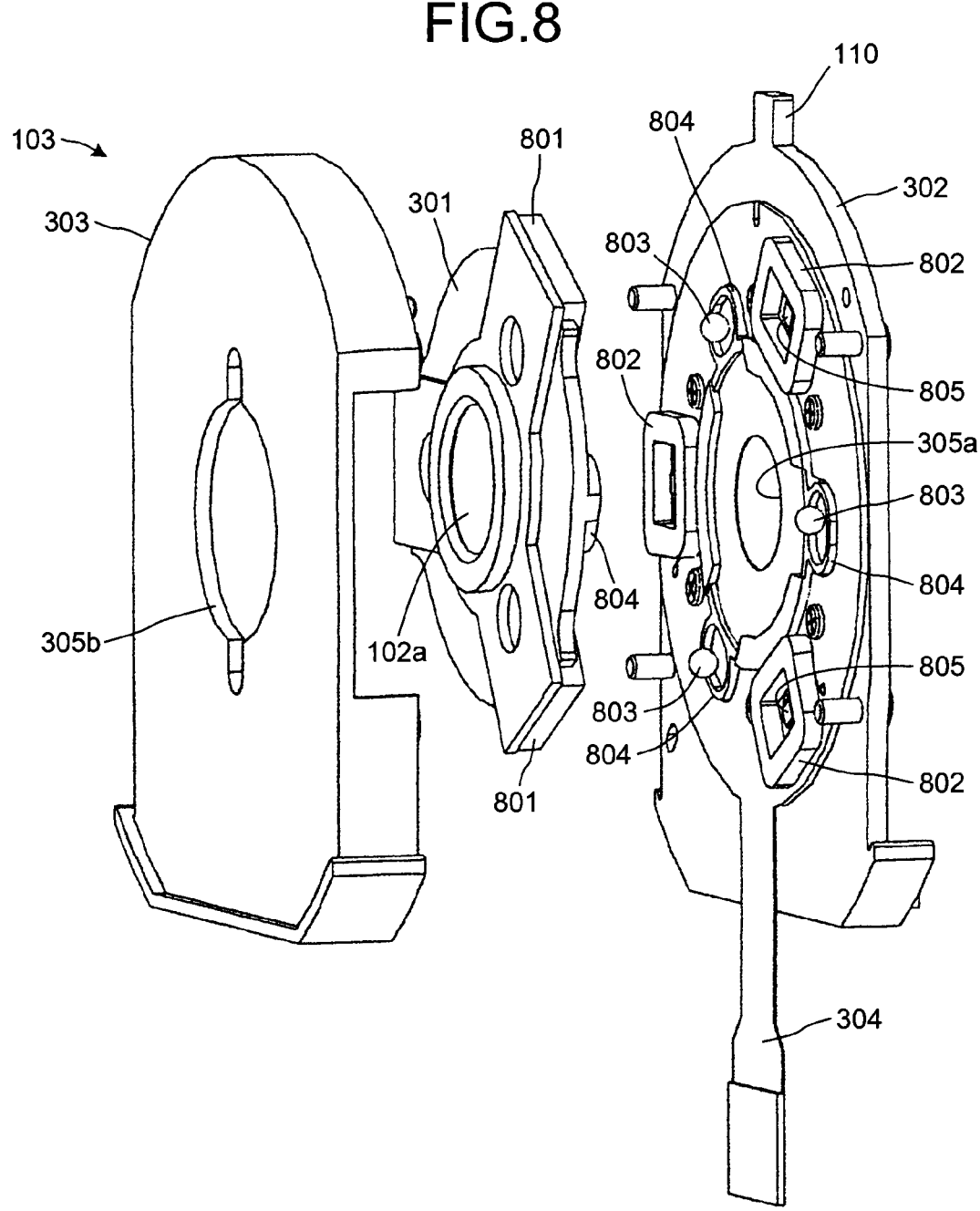

FIGS. 1 and 2 are schematics of a lens unit according to an embodiment of the present invention. FIG. 1 depicts a view of the lens unit from an oblique direction. FIG. 2 depicts a cross sectional view of the lens unit, along a plane parallel to an optical axis of the lens unit.

In FIGS. 1 and 2, a lens unit (lens apparatus) 100 according to the embodiment is coupled with the body of an imaging apparatus (not depicted) and configures the imaging apparatus. The body of the imaging apparatus includes an imaging element that converts incident light thereto into electricity and outputs an electrical signal according to the intensity of the incident light.

The imaging element, for example, may be implemented by a commonly known solid-state imaging element, such as a charge coupled device image sensor (CCD image sensor), a complementary metal oxide semiconductor image sensor (CMOS image sensor). The body of the imaging apparatus may be configured such that an image formed by the incident light transmitted through the lens unit 100 is produced on film rather than by an imaging element.

The lens unit 100 includes a lens barrel 101, imaging lenses (optical system) 102 disposed in the lens barrel 101, and an anti-vibration unit (image stabilizing apparatus) 103. The anti-vibration unit 103 includes a movable vibration-correcting lens 102a. The movable vibration-correcting lens 102a, for example, may be formed by one lens and without limitation hereto, may be configured by a group of lenses.

The movable vibration-correcting lens 102a is included among the imaging lenses 102 and is used for image stabilization. For example, the movable vibration-correcting lens 102a is disposed to be movable within a plane orthogonal to the optical axis and by moving the movable vibration-correcting lens 102a in the plane, image blur caused by vibration of the lens barrel 101 is corrected and the image is stabilized.

The anti-vibration unit 103 is insertable to and removable from the lens barrel 101. In the lens barrel 101, an opening 101a is provided enabling insertion and removal of the anti-vibration unit 103 with respect to the lens barrel 101. The opening 101a is of a size substantially consistent with a dimension (hereinafter, "width of anti-vibration unit") of the anti-vibration unit 103 orthogonal to the direction in which the anti-vibration unit 103 is moved for insertion to and removal from the lens barrel 101 (insertion/removal direction). The anti-vibration unit 103 is inserted into the opening 101a and when the anti-vibration unit 103 is disposed in the lens barrel 101, the opening 101a is closed by a casing 104 of the anti-vibration unit 103.

The casing 104 has a protective opening 104a on the object side. In the anti-vibration unit 103, the protective opening 104a extends from an end aspect on the object side of the casing 104 toward an eyepiece side to the movable vibration-correcting lens 102a and forms a recessed shape. An imaging lens 102b that is disposed adjacent to the anti-vibration unit 103 on the object side thereof partially overlaps the anti-vibration unit 103 along the direction of the optical axis, when at an extreme position on the eye piece side.

Alternatively, the configuration may be such that according to positioning along the direction of the optical axis of the imaging lens 102b or of a lens frame supporting the imaging lens 102b, the imaging lens 102b or the lens frame thereof can be visually confirmed to be out of or in the protective opening 104a.

Thus, by partially overlapping, along the direction of the optical axis, the imaging lens 102b adjacent to the anti-vibration unit 103 (or the lens frame supporting the imaging lens 102b) and the casing 104 of the anti-vibration unit 103, a dimension of the lens unit 100 along the direction of the optical axis may be reduced as compared with a state where there is no overlapping. Further, with such an overlapping configuration, constraints on the interval along the direction of the optical axis between the movable vibration-correcting lens 102a and the imaging lens 102b can be reduced and the overall length of the lenses in the optical system of the lens unit 100 can be reduced, i.e., a dimension of the lens unit 100 and the imaging apparatus equipped with the lens unit 100 can be reduced (be made slimmer).

The protective opening 104a is disposed, along the direction of the optical axis, farther on a focusing lens side than the casing 104. Preferably, at least a portion of a focusing lens used for adjusting focus or a portion of a lens frame supporting the focusing lens is inserted in the protective opening 104a, along the direction of the optical axis.

The anti-vibration unit 103 can be inserted to or removed from the lens barrel 101 when the imaging lens 102b or the lens frame supporting the imaging lens 102b (reference numeral omitted) is not in the protective opening 104a. That is, when a part of the imaging lens 102b or a part of the lens frame supporting the imaging lens 102b is in the protective opening 104a, the anti-vibration unit 103 cannot be inserted to or removed from the lens barrel 101.

In the lens unit 100, when along the direction of the optical axis, the imaging lens 102b or the lens frame supporting the imaging lens 102b is not in the protective opening 104a, the anti-vibration unit 103 is allowed to be inserted to or removed from lens barrel 101. Further, a locking mechanism (not depicted) may be provided.

This locking mechanism, for example, implements a mechanical configuration that according to the position of imaging lens 102b or the lens frame supporting the imaging lens 102b along the direction of the optical axis, establishes an unlocked state only when the imaging lens 102b or the lens frame thereof is not in the protective opening 104a.

Alternatively, the locking mechanism, for example, operates upon insertion and upon removal of the anti-vibration unit 103. An operation button (not depicted) is provided and when the operation button is pressed, the imaging lens 102b or the lens frame thereof is moved along the direction of the optical axis to be out of the protective opening 104a, enabling implementation of control together with a mechanical configuration.

Reference numeral 110 in FIG. 1 indicates a protrusion that determines the position of the anti-vibration unit 103 with respect to the lens barrel 101. Within the lens barrel 101, a protrusion receiving member (not depicted) into which the protrusion 110 is inserted is provided. Through the protrusion 110 and the protrusion receiving member, the anti-vibration unit 103 is positioned at a given position with respect to the lens barrel 101.

FIGS. 3 to 8 are schematics of the anti-vibration unit 103. As depicted in the respective figures, the anti-vibration unit 103 includes the movable vibration-correcting lens 102a, a movable lens frame 301, an anti-vibration unit outer-frame (plate) 302, and an anti-vibration unit cover 303.

The movable lens frame 301 supports the movable vibration-correcting lens 102a and is movable with respect to the anti-vibration unit outer-frame 302. The anti-vibration unit cover 303 together with the anti-vibration unit outer-frame 302 form the casing 104. The movable lens frame 301 is sandwiched between the anti-vibration unit cover 303 and the anti-vibration unit outer-frame 302, and is movable within the casing 104.

Driving magnets 801 are provided in the movable lens frame 301. The driving magnets 801 have an oblong shape and are attached to the movable lens frame 301 such that the orientation of the lengths of the driving magnets 801 coincide with tangents of a circle having a center about the optical axis. Three driving magnets 801 are provided at equivalent intervals along a concentric circle whose center is at the optical axis of the movable vibration-correcting lens 102a, i.e., the driving magnets 801 are spaced at intervals to form central angles of 120 degrees with respect to the center of the circle whose center is at the optical axis of the movable vibration-correcting lens 102a, which is supported by the movable lens frame 301.

In the embodiment, the anti-vibration lens unit 100 has been described to drive the movable vibration-correcting lens 102a by three driving magnets 801; however, configuration is not limited hereto. The number of the driving magnets 801 may be, for example, two or four, each provided respectively on orthogonal axes in a plane orthogonal to the optical axis.

In the anti-vibration unit outer-frame 302, driving coils 802 and adhering yokes 401 are provided, at positions opposing the driving magnets 801. The driving coils 802 are disposed in the anti-vibration unit outer-frame 302, on a side facing the movable lens frame 301. The adhering yokes 401 have an oblong shape of a size that is substantially consistent with that of the driving magnets 801 and are disposed in the anti-vibration unit outer-frame 302 on the side opposite to the movable lens frame 301. The protective opening 104a is provided in the anti-vibration unit outer-frame 302.

A magnetic force adhering the anti-vibration unit outer-frame 302 and the movable lens frame 301 is at work between the driving magnets 801 and the adhering yokes 401. Through this magnetic force, a pushing force is at work in a direction of adhesion between the anti-vibration unit outer-frame 302 and the movable lens frame 301.

The anti-vibration unit outer-frame 302 is formed of a non-magnetic material and thus, the magnetic force of the driving magnet 801 can be made to work more effectively on the adhering yokes 401. Three driving coils 802 are provided at equivalent intervals on a concentric circle whose center is at the optical axis of the movable vibration-correcting lens 102a. Along the direction of the optical axis, the driving coils 802 are disposed at given intervals between the driving magnets 801.

For example, the anti-vibration unit outer-frame 302 and the movable lens frame 301 oppose each other and have, along the direction of the optical axis, spherical bodies 803 therebetween. In the present embodiment, the spherical bodies 803 have a spherical shape of a diameter that is smaller than a dimension of the driving coils 802 along the direction of the optical axis. Three spherical bodies 803 are disposed at equivalent intervals on a concentric circle whose center is at the optical axis of the movable vibration-correcting lens 102a.

Through the magnetic force at work between the driving magnet 801 and the adhering yokes 401, a pushing force is at work in a direction causing adhesion between the anti-vibration unit outer-frame 302 and movable lens frame 301. Thus, each of the spherical bodies 803 is held sandwiched between the anti-vibration unit outer-frame 302 and the movable lens frame 301.

As a result, the anti-vibration unit outer-frame 302 and the movable lens frame 301 oppose each other having a gap therebetween along the direction of the optical axis consistent with the diameter of the spherical bodies 803. Consequently, the driving magnet 801 and the driving coils 802 in the movable lens frame 301 oppose each other having a gap therebetween along the direction of the optical axis consistent with the difference between the diameter of the spherical bodies 803 and the dimension of the driving coils 802 along the direction of the optical axis.

The spherical bodies 803 may be formed using a high polymer material such as plastic. Further, the spherical bodies 803 may be implemented by a metal sphere such steel, aluminum, etc. and are not limited to a completely spherical shape. For example, portions of the spherical bodies 803 in contact with the anti-vibration unit outer-frame 302 and the movable lens frame 301 may be roughly spherical.

Positions of the spherical bodies 803 are determined by spherical-body receiving members 804 disposed in the anti-vibration unit outer-frame 302 and the movable lens frame 301, respectively. The spherical-body receiving members 804 are implemented in the anti-vibration unit outer-frame 302 and the movable lens frame 301 by a ring-shaped rib that protrudes toward the movable lens frame 301 or the anti-vibration unit outer-frame 302 side.

The driving magnets 801 attached at positions corresponding to the driving coils 802 together with the driving coils 802 constitute a linear motor. With the spherical bodies 803 held sandwiched between the anti-vibration unit outer-frame 302 and the movable lens frame 301, through the rolling of the spherical bodies 803 within the spherical-body receiving members 804, the movable lens frame 301 is movable within a plane orthogonal to the optical axis in an arbitrary direction with respect to the anti-vibration unit outer-frame 302 (translation or rotation). Translation and rotation of the movable lens frame 301 with respect to the anti-vibration unit outer-frame 302 is controlled by the linear motor constituted by the driving coils 802 and the driving magnets 801.

In the anti-vibration unit outer-frame 302, at a position at an inner aspect of each of the driving coils 802, a Hall element 805 is disposed. The Hall elements 805 detect the magnetism of the driving magnets 801, which oppose the Hall elements 805 along the direction of the optical axis. Output from the Hall elements 805 changes according to the strength of the detected magnetism. Output from the Hall elements 805 is input to a position detecting amplifier (refer to FIG. 10). The position detecting amplifier forms a portion of a drive control circuit in the lens unit 100.

In the anti-vibration unit outer-frame 302, a flexible printed circuit board 304 for supplying electrical current to the driving coils 802 and inputting signals output from the Hall elements 805 to the drive control circuit of the lens unit 100 is provided. The flexible printed circuit board 304 is formed by a wiring pattern on a conductive sheet on an adhesive layer on a film-shaped insulator (base film) and has a configuration in which the conductive sheet is sheathed by the insulator. As the flexible printed circuit board 304 is a commonly known technology, explanation thereof is omitted herein.

The casing 104 includes an opening 402 at a position overlapping a movable range of the movable lens frame 301 that moves (translation and rotation) within the casing 104. Disposal of the opening 402 enables the width of the casing 104 of the anti-vibration unit 103 and the displacement of the movable lens frame 301 along the direction of the width of the anti-vibration unit 103 to be substantially equivalent and thus, the range of displacement of the movable lens frame 301 is assured while enabling a reduction in the width of the anti-vibration unit 103.

A reduction in the width of the anti-vibration unit 103 enables the opening 101a in the lens barrel 101 to be smaller. Further, by reducing the size of the opening 101a, dust and other foreign particles are prevented from entering the lens barrel 101 through the opening 101a, thereby preventing degradations in image quality resulting from foreign particles on the imaging lenses 102.

The casing 104 further includes an opening 305 that transmits, from the object side to the eye piece side (an imaging element side), external light that enters the lens barrel 101. The opening 305 is implemented by an opening 305a penetrating, along the direction of the optical axis, the anti-vibration unit outer-frame 302 and an opening 305b penetrating, along the direction of the optical axis, the anti-vibration unit cover 303. The opening 305a is positioned at a bottom portion of the recessed shaped formed by the protective opening 104a. The movable vibration-correcting lens 102a is positioned, along the direction of the optical axis, between the opening 305a and the opening 305b.

Figure 10:
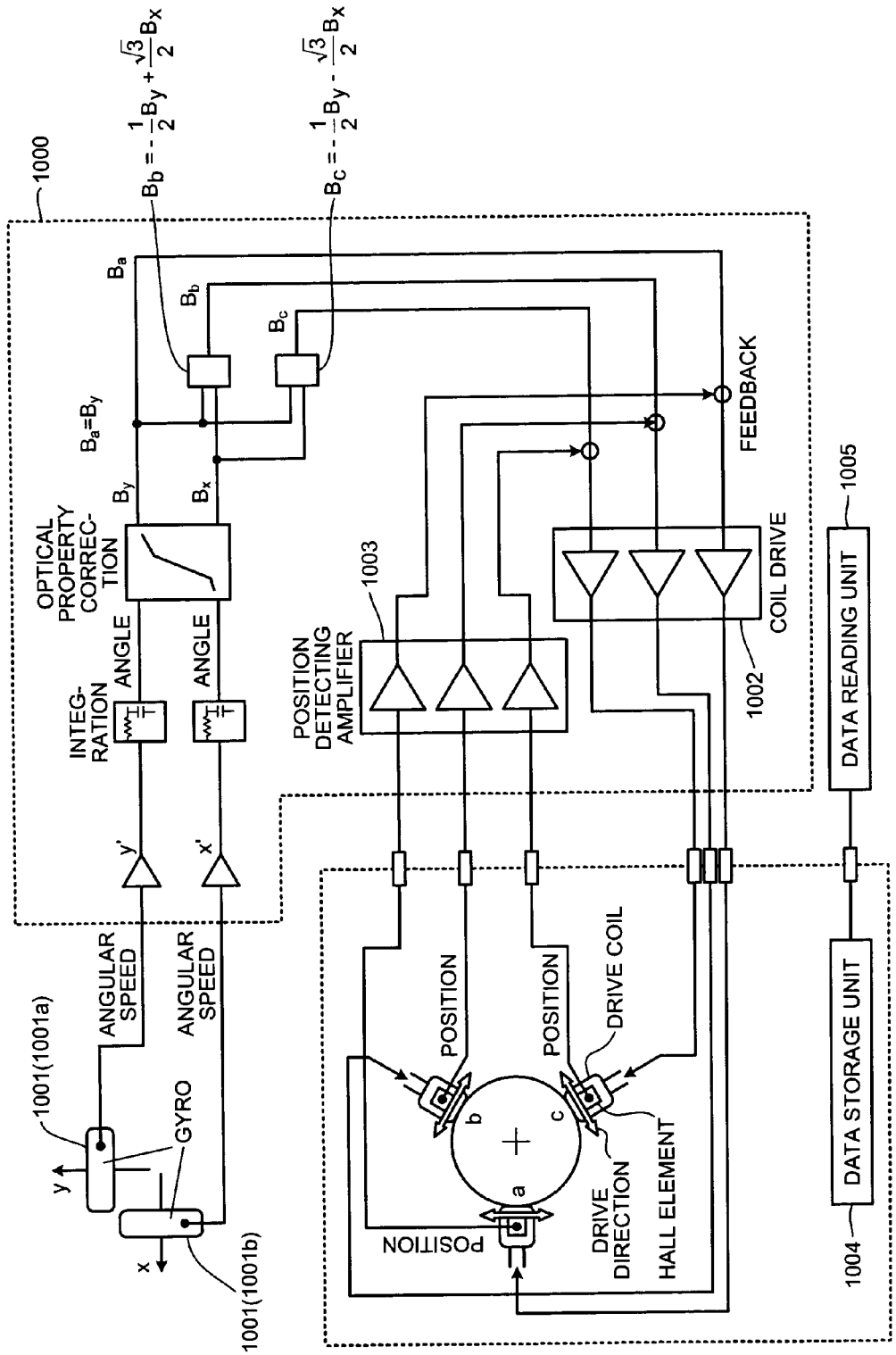
FIG. 10 is a block diagram of a drive control circuit in the lens unit.

The lens unit 100 includes a gyro (refer to reference numeral 1001 in FIG. 10). For example, the lens unit 100 includes a gyro that detects angular speed for yaw motion and a gyro that detects angular speed for pitch motion. In the lens unit 100, based on the angular speeds detected by the gyros, vibration of the lens barrel 101 is detected.

The gyros included in the lens unit 100 are implemented by, for example, piezoelectric oscillation gyros. The drive control circuit in the lens unit 100 causes the movable vibration-correcting lens 102a in the anti-vibration unit 103 to move based on the vibration detected by the gyros, thereby stabilizing the image formed by the imaging element.

Figure 9:
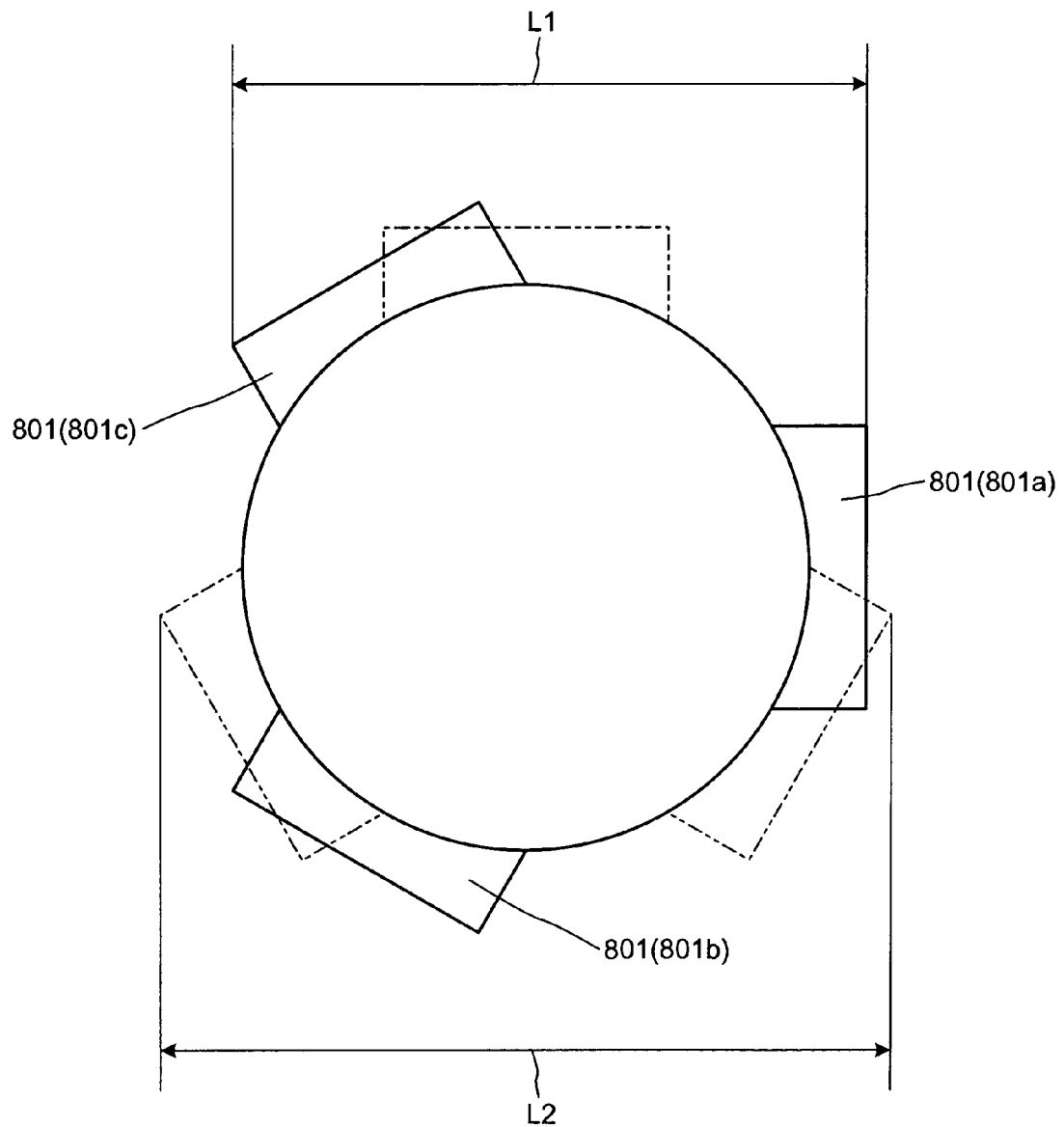
FIG. 9 is a schematic depicting arrangement of a movable lens frame in the lens unit.

FIG. 9 is a schematic depicting arrangement of the movable lens frame 301 in the lens unit 100. As depicted in FIG. 9, the movable lens frame 301 is positioned such that, among the three driving magnets 801 (801a, 801b, and 801c), the length of the driving magnet 801 (801a) is aligned along the insertion/removal direction of the anti-vibration unit 103.

Positioning the driving magnets 801 (801a, 801b, and 801c) as described, compared to other positioning, enables the width of the anti-vibration unit 103 (reference character L1 in FIG. 9) to be minimized. For example, if the length of the driving magnet 801 (801a) is aligned along the direction of the width of the anti-vibration unit 103, the width of the anti-vibration unit 103 (reference character L2 in FIG. 9) becomes large as compared to the L1.

FIG. 10 is a block diagram of the drive control circuit in the lens unit 100. As depicted in FIG. 10 a drive control circuit 1000 in the lens unit 100 detects vibration of the lens unit 100 using gyros 1001 (1001a and 1001b).

The drive control circuit 1000, based on the angular speeds detected by the gyros 1001, generates a lens-positioning instruction signal. The lens-positioning instruction signal is a signal indicating, by time series, the position to which the movable vibration-correcting lens 102a is to be moved.

For example, the drive control circuit 1000 temporally integrates the angular speed in the yaw direction detected by the gyro 1001a and by executing a given optical property correction, generates a horizontal component Bx of the lens-positioning instruction signal. The drive control circuit 1000, for example, based on the angular speed in the pitch direction detected by the gyro 1001b, generates a vertical component By of the lens-positioning instruction signal. Based on the generated horizontal component Bx (direction along X-axis)

and vertical component By (direction along Y-axis), the drive control circuit 1000 generates the lens-positioning instruction signal.

The lens-positioning instruction signal, based on displacement Bx along the direction of the X-axis and displacement By along the direction of the Y-axis, is obtained from the following equations, where Ba, Bb, and Bc respectively indicate the degree to which the positions of the border of magnetic poles of the driving magnets 801 opposing the Hall elements 805 are not aligned with the center of sensitivity of the Hall elements 805.

$$B_a = B_y \qquad (1)$$
$$B_b = -\frac{1}{2}B_y + \frac{\sqrt{3}}{2}B_x$$
$$B_c = -\frac{1}{2}B_y - \frac{\sqrt{3}}{2}B_x$$

Based on the generated lens-positioning instruction signal, coil position instruction signals for the driving coils 802 are generated. The coil position instruction signals indicate positional relations between the driving coils 802 and the driving magnets 801 corresponding to the driving coils 802 when the movable vibration-correcting lens 102a is moved to the position indicated by the lens-positioning instruction signal. The generated coil position instruction signals are output to coil driving circuits 1002, respectively provided for each of the driving coils 802 in the drive control circuit 1000.

The coil driving circuits 1002 receive signals output from the Hall elements 805 and amplified by the position detecting amplifiers 1003. The amplified signals indicate displacement (driving amount) of the driving magnets 801 with respect to the driving coils 802.

Alternatively, the amplified signals may indicate positions of the driving magnets 801. The coil driving circuits 1002 output to the driving coils 802, current that is proportional to the difference between the coil position instruction signals and the signals amplified by the position detecting amplifiers 1003.

As a result of the current passing through the driving coils 802, a magnetic field proportional to the current is generated. Through the magnetic field, the driving magnets 801, which are arranged corresponding to the driving coils 802, are subjected to a driving force in a direction toward the positions indicated by the coil position instruction signals Ba, Bb, and Bc. Thus, the movable lens frame 301 is moved.

When the driving magnets 801, through the driving force, reach the positions indicated by the coil position instruction signals, the coil position instruction signal and the signals output from the Hall elements 805 become equivalent and hence, the output from the driving circuit becomes zero and the driving force becomes zero. Further, if the driving magnets 801 are displaced from the positions indicated by the coil position instruction signals as a result of interference or changes in the coil position instruction signals, current is again passed through the driving coils 802 and the driving magnets 801 are returned to the positions indicated by the coil position instruction signals.

When the driving magnets 801 reach the positions indicated by the coil position instruction signals, the difference between the coil position instruction signal and the output from the position detecting amplifier 1003 disappears. When the difference between the coil position instruction signals and the output from the position detecting amplifier 1003 disappears, the current stops passing through the driving coils 802 and the driving force acting on the driving magnets 801 becomes zero.

By moving the driving magnets 801 to the positions indicated by the coil position instruction signals with respect to the driving coils 802, the drive control circuit 1000 moves the movable vibration-correcting lens 102a to the position indicated by the lens-positioning instruction signal. Thus, the movable vibration-correcting lens 102a is moved momentarily according to the lens-positioning instruction signals and even if, for example, the lens unit 100 is vibrated during exposure upon capturing an image, disturbance of the image formed by the imaging element is prevented, thereby enabling stabilization of the image.

If the movable lens frame 301 is rotated, the coil position instruction signals respectively have an identical value. For example, the coil position instruction signals Ba, Bb, and Bc to rotate the movable lens frame 301 clockwise by angle θ [rad] are expressed by the following equations, where R is the radius of a circle having a center at the optical axis, i.e., indicates the distance from the optical axis to the center of sensitivity of the Hall elements 805.

$$B_a = R\theta$$
$$B_b = R\theta \qquad (2)$$
$$B_c = R\theta$$

Through the described control, the driving magnets 801 move equidistance in tangential directions and with respect to the driving coils 802 and thus, the movable lens frame 301, with the optical axis of the movable vibration-correcting lens 102a and the optical axis of the imaging lenses 102 maintained in an aligned state, rotates about the optical axis. The described action is momentarily repeated to move, according to the lens-positioning instruction signal, the movable vibration-correcting lens 102a, which is attached to the movable lens frame 301 having the driving magnets 801. Thereby, the image formed by the imaging element is stabilized.

As depicted in FIG. 10, a data storage unit 1004 stores therein various types of data (anti-vibration correction data) specific to each anti-vibration unit 103. The various types of data (anti-vibration correction data) are used in performing anti-vibration correction control to move the movable vibration-correcting lens 102a according to vibration of the lens unit 100. The data storage unit 1004, for example, stores data (anti-vibration correction data) related to detection sensitivity for detecting displacement, effective resolution, center positioning data, maximum displacement, response, offset amounts, magnification, degree of correction effect, etc.

The data storage unit 1004 continuously stores the data even when the power is turned off, i.e., is implemented by a nonvolatile recording medium. For example, the data storage unit 1004 may be implemented using commonly known recording media such as EPROM, EEPROM, flash memory, etc.

The data (anti-vibration correction data) stored in the data storage unit 1004, for example, may be obtained by actual measurements taken for each anti-vibration unit 103. Further, the stored data (anti-vibration correction data), for example, may be obtained by actual measurements taken for each manufacturing lot of the anti-vibration unit 103.

When anti-vibration correction control is performed to move the movable vibration-correcting lens 102a according to vibration of the lens unit 100, a data reading unit 1005 reads various types of data (anti-vibration correction data) stored in the data storage unit 1004. The data (anti-vibration correction data) read by the data reading unit 1005 is input to the position detecting amplifier 1003 and is used in the calculation of the displacement of the driving magnets 801 (driving amount) with respect to the driving coils 802 or in the calculation of the positions of the driving magnets 801.

Figure 11:
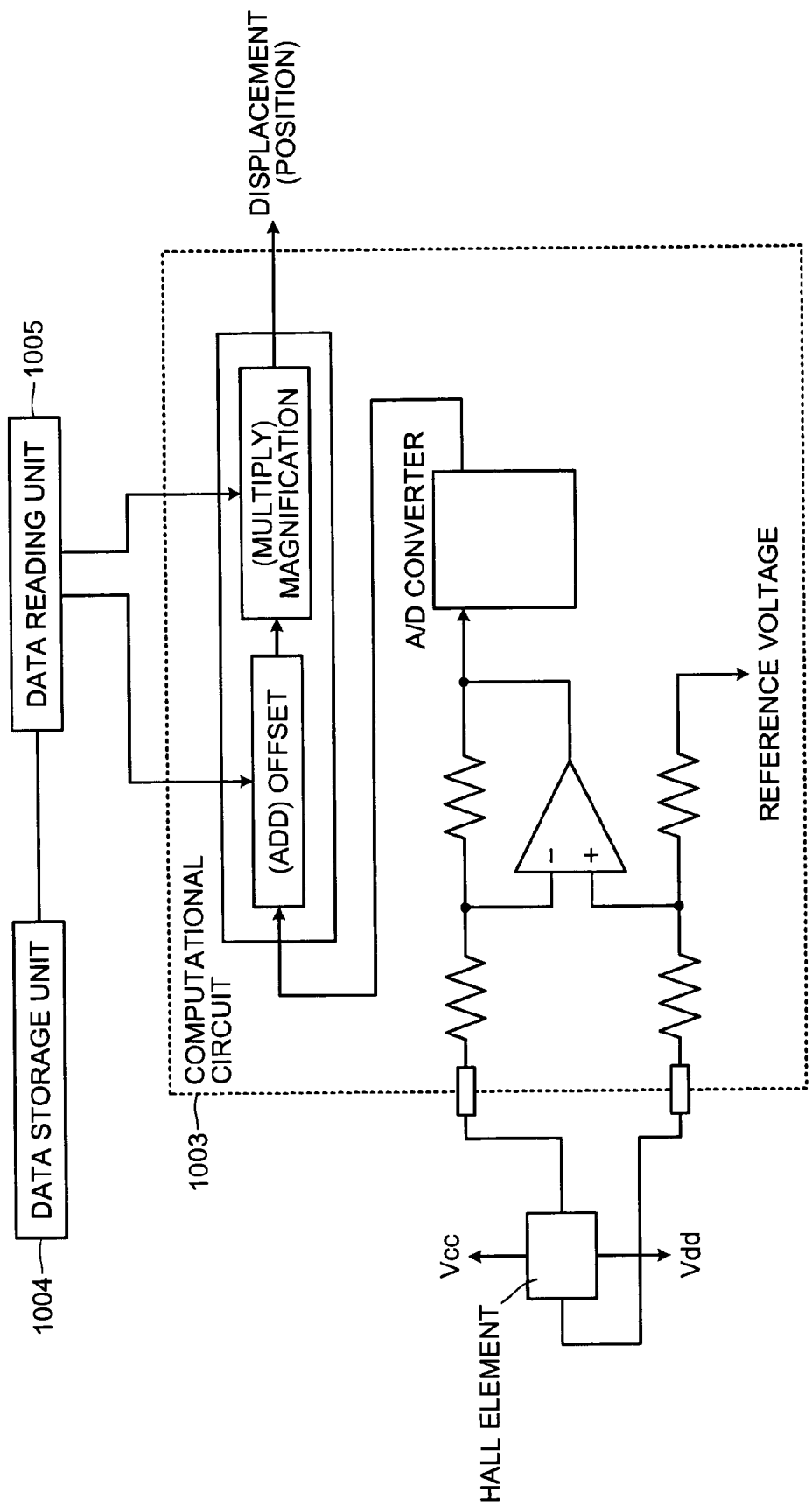
FIG. 11 is a schematic of an example of a position detecting amplifier.

FIG. 11 is a schematic of an example of the position detecting amplifier 1003. As depicted in FIG. 11, the position detecting amplifier 1003, A/D converts the signals output from the Hall elements 805 and based on the data (anti-vibration correction data) read from the data reading unit 1005, calculates the displacement for the driving magnets (driving amount) with respect to the driving coils 802 or calculates the positions for the driving magnets 801.

For example, based on offset amounts read from the data storage unit 1004 by the data reading unit 1005, the position detecting amplifier 1003 calculates offset positions for the driving magnets 801. As calculation of the offset positions for the driving magnets 801 is easily implemented by a commonly known technology, further explanation is omitted herein.

Further, based on magnification read from the data storage unit 1004 by the data reading unit 1005, the position detecting amplifier 1003, for example, calculates correction values for correcting properties of the Hall elements 805. As calculation of correction values for correcting properties of the Hall elements 805 is easily implemented by a commonly known technology, further explanation is omitted herein.

The position detecting amplifier 1003, etc. in the drive control circuit 1000 may be implemented by, for example, a central processing unit. Calculation processing executed in the drive control circuit 1000, including that of the position detecting amplifier 1003 is easily implemented by a commonly known technology, and thus, further explanation is omitted herein.

Figure 12:
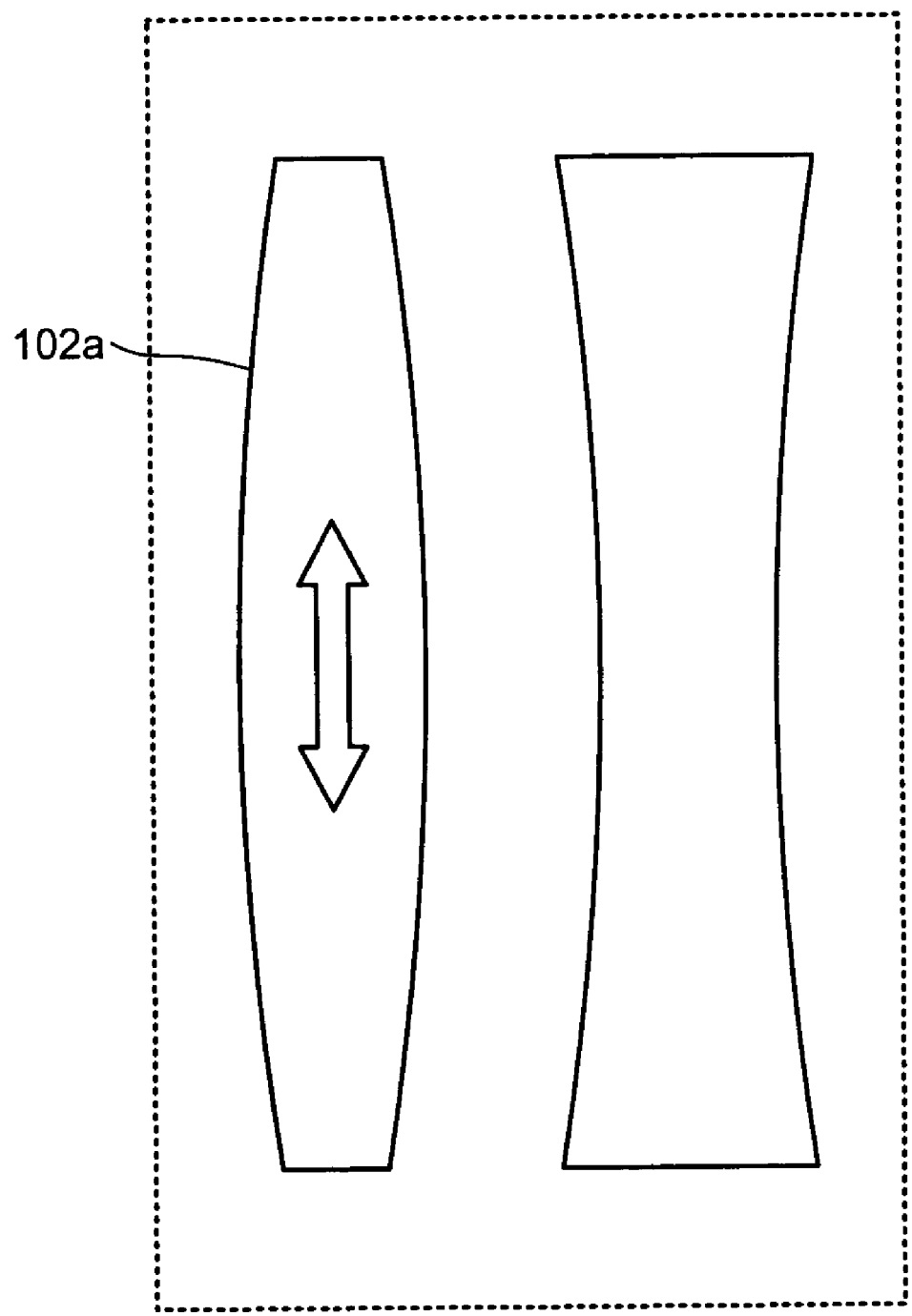
FIGS. 12 and 13 are schematics depicting relations between the effect of a movable vibration-correcting lens and drive properties of the movable vibration-correcting lens.
Figure 13:
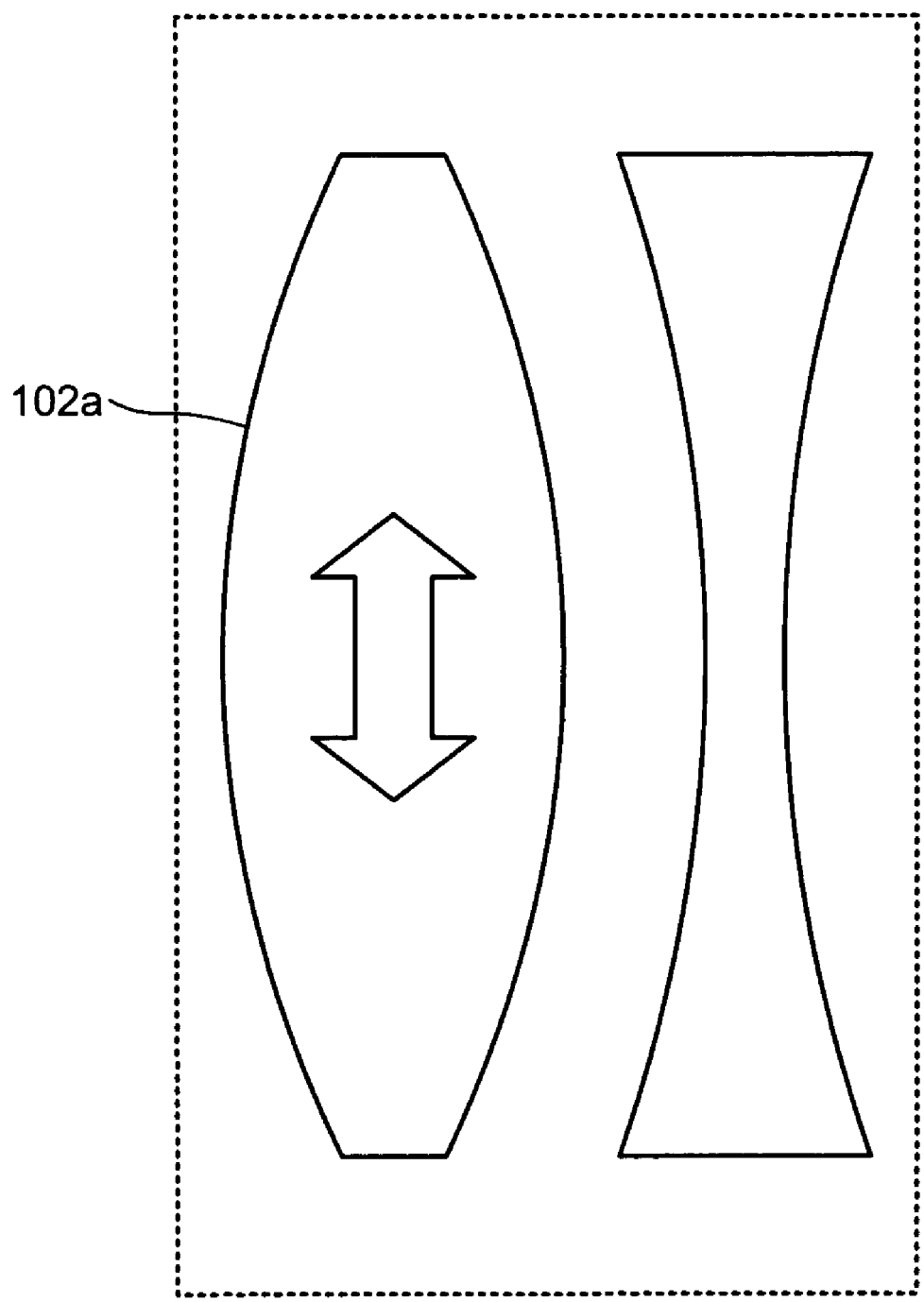
Figure 14:
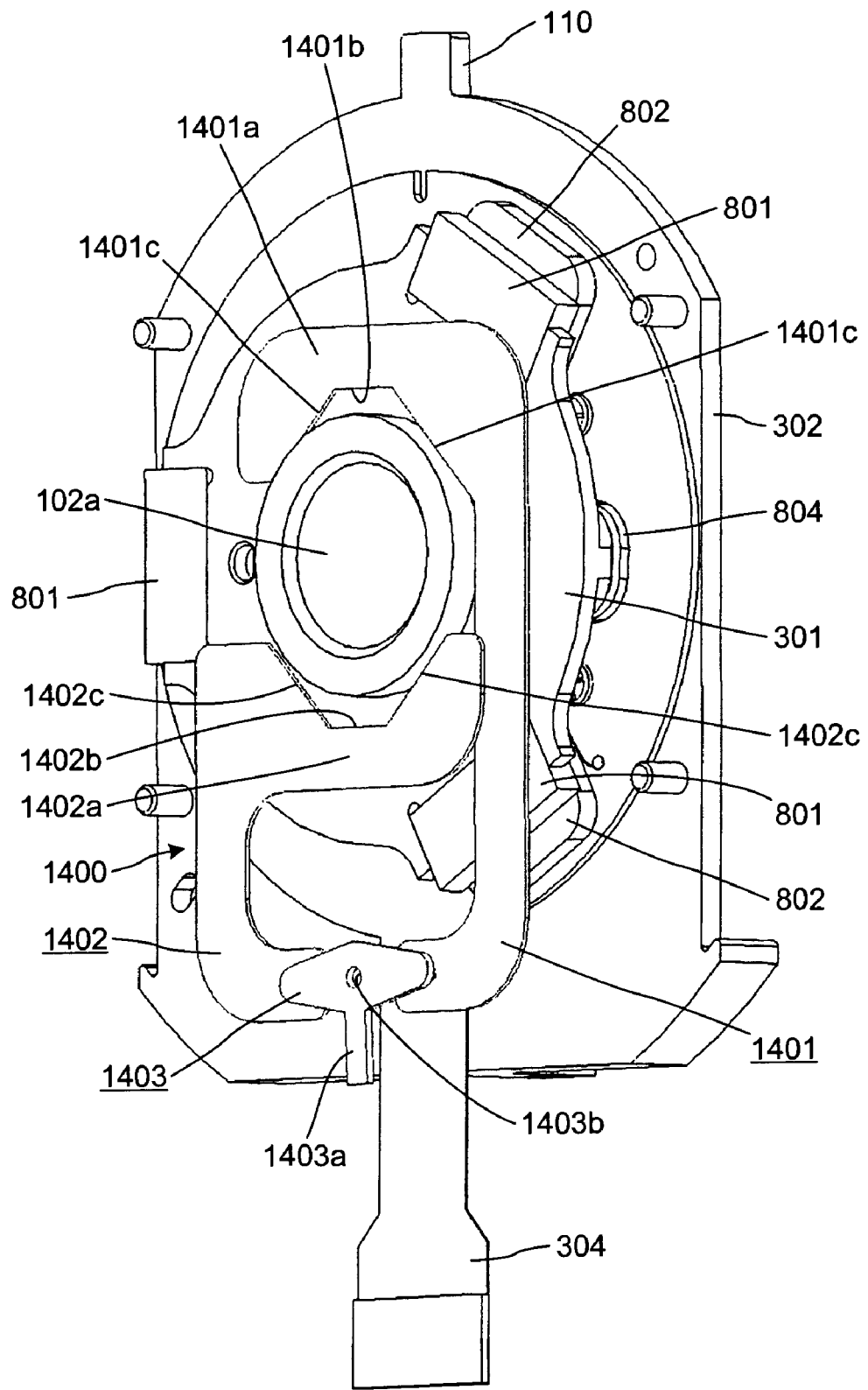
FIGS. 14, 15, 16, and 17 are schematics of an example of a locking mechanism of the movable vibration-correcting lens.
Figure 15:
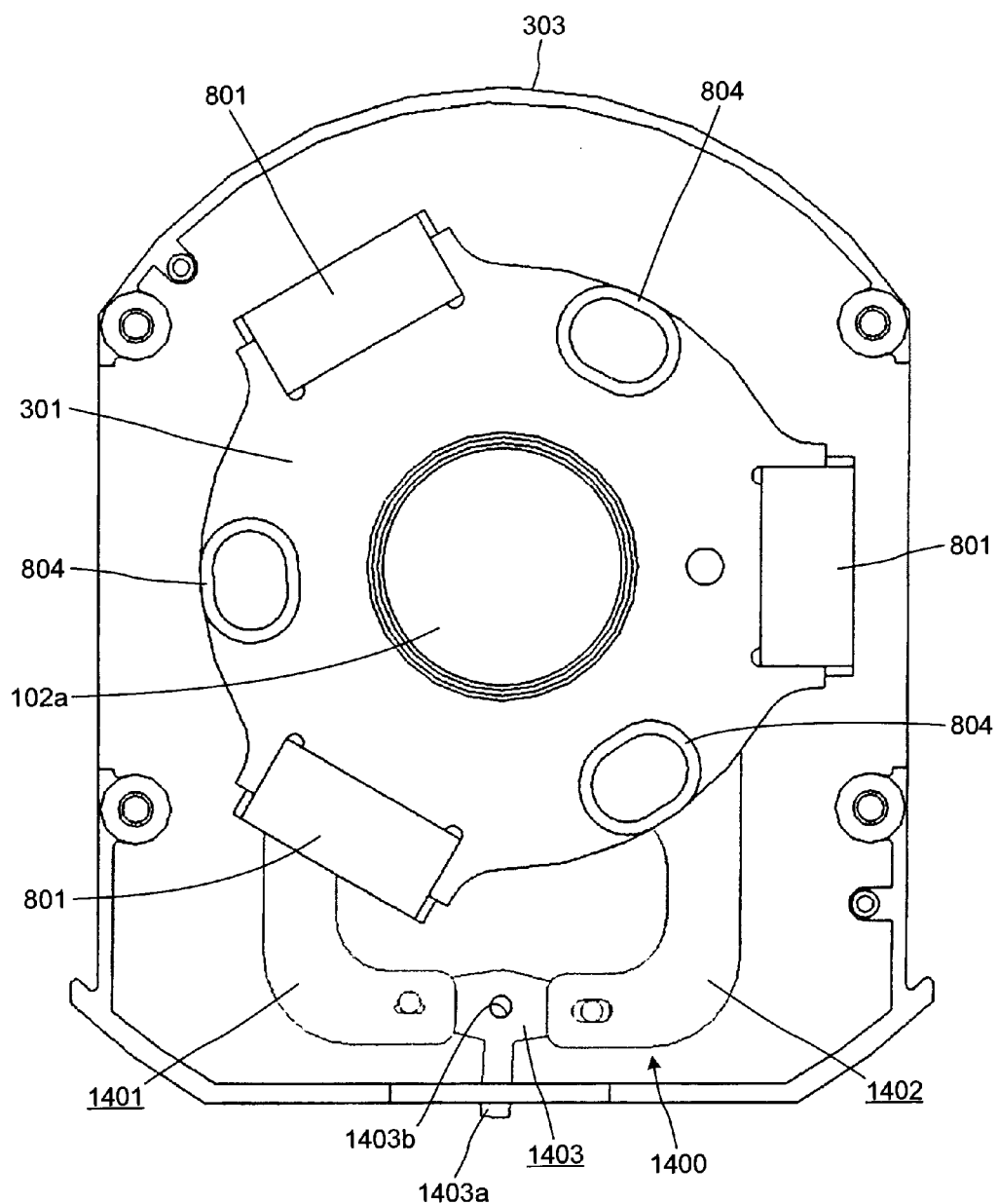

FIGS. 12 and 13 are schematics depicting relations between the effect of the movable vibration-correcting lens 102*a* and drive properties of the movable vibration-correcting lens 102*a*. As depicted in FIGS. 12 and 13, when the effect of the movable vibration-correcting lens 102*a* (and the correcting lens according to correction of the formed image) is small, the movable vibration-correcting lens 102*a* is controlled such that the movement of the concerned movable vibration-correcting lens 102*a* is fine. On the other hand, as depicted in FIGS. 12 and 13, when effect of the movable vibration-correcting lens 102*a* (and the correcting lens according to correction of the formed image) is large, the movable vibration-correcting lens 102*a* is controlled such that the movement of the movable vibration-correcting lens 102*a* is fast.

Such anti-vibration correction control controlling the driving of the movable vibration-correcting lens 102*a* according to vibration of the lens unit 100 is executed based on the various types of data (anti-vibration correction data) stored in the data storage unit 1004. In the present embodiment, the data (anti-vibration correction data) is stored to the data storage unit 1004 before the anti-vibration unit 103 is assembled into the lens unit 100, i.e., while the anti-vibration unit 103 is in an independent state.

When the data (anti-vibration correction data) to be stored to the data storage unit 1004 is acquired, the position of the movable vibration-correcting lens 102*a* is fixed with respect to the casing 104 of the anti-vibration unit 103. The movable vibration-correcting lens 102*a* is fixed at a neutral position in the anti-vibration unit 103 by a given locking mechanism. Hereinafter, a state in which the movable vibration-correcting lens 102*a* is fixed at a neutral position in the anti-vibration unit 103 is referred to as a "locked state" and a state in which the locked state is released is referred to as an "unlocked state".

FIGS. 14, 15, 16, and 17 are schematics of an example of a locking mechanism of the movable vibration-correcting lens 102*a*.

As depicted in FIGS. 14, 15, 16, and FIG. 17, a locking mechanism (locking unit) 1400 of the movable vibration-correcting lens 102*a* is provided in the casing 104 of the anti-vibration unit 103. The locking mechanism 1400 is implemented by retaining members 1401, 1402, and 1403 sandwiched between the anti-vibration unit cover 303 of the anti-vibration unit 103 and the movable lens frame 301.

The retaining member 1401 and the retaining member 1402 slide in the insertion/removal direction of the anti-vibration unit 103 and can be slide within the casing 104 to be disjoined from the movable vibration-correcting lens 102*a*.

In the embodiment, although the locking mechanism 1400 has been described in which the retaining member 1401 and the retaining member 1402 slide in the insertion/removal direction of the anti-vibration unit 103, the direction in which the retaining member 1401 and the retaining member 1402 slide is not limited hereto. For example, the retaining member 1401 and the retaining member 1402 may slide along the direction of the width of the anti-vibration unit 103.

The retaining member 1401 and the retaining member 1402 include retaining arms (retaining unit) 1401*a* and 1402*a*, respectively. The retaining arms 1401*a* and 1402*a* oppose each other with the movable vibration-correcting lens 102*a* therebetween. The retaining arms 1401*a* and 1402*a*, at a position opposing the movable vibration-correcting lens 102*a*, have recessed portions 1401*b* and 1402*b* that are substantially about an outer edge of the movable vibration-correcting lens 102*a*.

The recessed portions 1401*b* and 1402*b* provided in the retaining arms 1401*a* and 1402*a* have oblique portions 1401*c* and oblique portions 1402*c*, respectively. The oblique portions 1401*c* and 1402*c* are slanted such that the farther the recessed portions 1401*b* and 1402*b* recede from the retaining arm 1401*a* and the retaining arm 1402*a*, the width of the recessed portions 1401*b* and 1402*b* becomes narrower. That is, the oblique portions 1401*c* and 1402*c* are arranged such that the width of the recessed portions 1401*b* and 1402*b* facing the movable vibration-correcting lens 102*a* becomes narrower toward the bottom of the recessed portions 1401*b* and 1402*b*.

In the locking mechanism 1400, when the retaining members 1401 and 1402 slide in a direction so that the retaining arms 1401*a* and 1402*a* approach the movable vibration-correcting lens 102*a*, the retaining arms 1401*a* and 1402*a* move to sandwich the movable vibration-correcting lens 102*a*, and the oblique portions 1401*c* and 1402*c* in the retaining arms 1401*a* and 1402*a* abut the outer edge of the movable vibration-correcting lens 102*a*.

Figure 17:
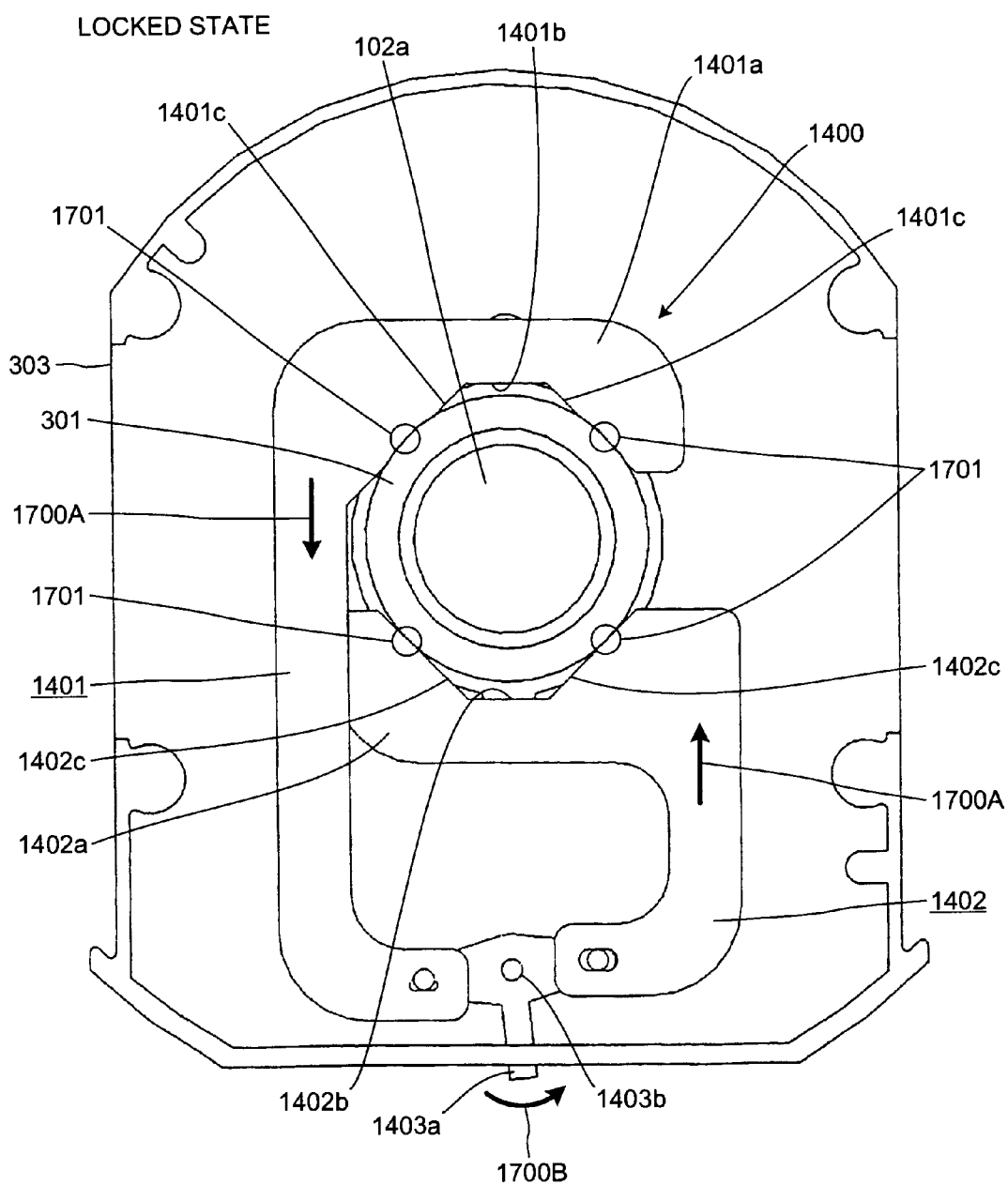

In the locking mechanism 1400, the retaining members 1401 and 1402 slide in the directions indicated by reference character 1700A in FIG. 17 to sandwich the movable vibration-correcting lens 102*a* by the retaining arms 1401*a* and 1402*a* and thereby, the movable vibration-correcting lens 102*a* is maintained at a neutral position of the mechanism in the anti-vibration unit 103, i.e., is in a locked stated.

The oblique portions 1401*c* and 1402*c* are provided in the retaining member 1401 and the retaining member 1402 such that, with the movable vibration-correcting lens 102*a* in a sandwiched state, the movable vibration-correcting lens 102*a* is moved to a neutral position of the mechanism in the anti-vibration unit 103. Thus, by sliding the retaining members

1401 and 1402 so that the movable vibration-correcting lens 102a is sandwiched between the retaining arms 1401a and 1402a, the movable vibration-correcting lens 102a abutted by the oblique portions 1401c and 1402c is subject to a force by the oblique portions 1401c and 1402c and moves along the oblique portions 1401c and 1402c.

Consequently, by simply sliding the retaining members 1401 and 1402 such that the movable vibration-correcting lens 102a is sandwiched between the retaining arms 1401a and 1402a, even if the movable vibration-correcting lens 102a is displaced from the neutral position, the movable vibration-correcting lens 102a can be fixed in a state where the movable vibration-correcting lens 102a is maintained at a neutral position of the mechanism in the anti-vibration unit 103.

When the locking mechanism 1400 is in a locked state, the oblique portions 1401c and 1402c abut the outer edge of the movable vibration-correcting lens 102a at the positions indicated by circles (reference numeral 1701) in FIG. 17. By abutting the outer edge of the movable vibration-correcting lens 102a from four directions, the positioning of the movable vibration-correcting lens 102a is stably fixed.

Figure 16:
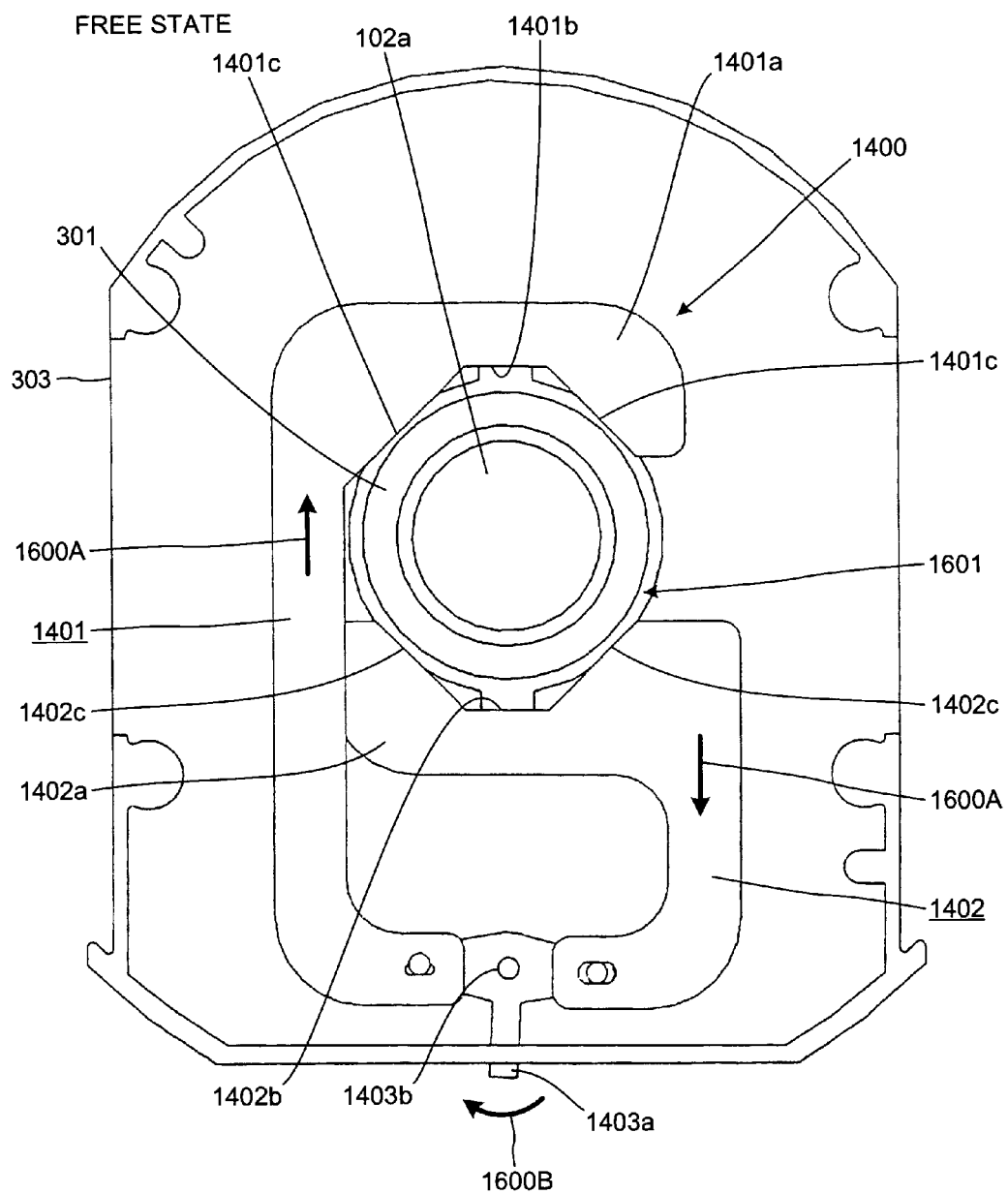

In the locking mechanism 1400, the retaining members 1401 and 1402 slide in the directions indicated by an arrow 1600A in FIG. 16 and by separating the retaining arms 1401a and 1402a from the movable vibration-correcting lens 102a, which is sandwiched by the retaining arms 1401a and 1402a, the movable vibration-correcting lens 102a can be moved within the casing 104 of the anti-vibration unit 103, i.e., is in an unlocked state.

In the unlocked state, between the outer edge of the movable vibration-correcting lens 102a and the oblique portions 1401c and 1402c, a given clearance 1601 is formed. The movable lens frame 301 can be moved within the range of the clearance 1601. The distance that the retaining members 1401 and 1402 slide and the shape of the recessed portions 1401b and 1402b are designed to establish the clearance 1601 of a size that enables the movable lens frame 301, in an unlocked state, to sufficiently move when the anti-vibration correction control is executed.

Further, in the locking mechanism 1400, because the retaining members 1401 and 1402 slide in the insertion/removal direction of the anti-vibration unit 103, there is no need to increase the width of the anti-vibration unit 103 to secure space for the retaining members 1401 and 1402 to slide. Consequently, the width of the anti-vibration unit 103 can be reduced (made slimmer).

By reducing (making slimmer) the width of the anti-vibration unit 103, the opening 101a in the lens barrel 101 can be made smaller. Reduction in the size of the opening 101a prevents dust and foreign particles from entering the lens barrel 101 through the opening 101a, thereby preventing degradations in image quality resulting from foreign particles on the imaging lenses 102.

In the locking mechanism 1400, if the retaining members 1401 and 1402 are configured to slide along the direction of the width of the anti-vibration unit 103, there is no need to increase a dimension of the anti-vibration unit 103 parallel to the insertion/removal direction in order to establish space for the retaining members 1401 and 1402 to slide. Consequently, the dimension of the anti-vibration unit 103 parallel to the insertion/removal direction can be reduced.

The retaining member (actuating unit) 1403 in the locking mechanism 1400 is interlocked with the retaining member 1401 and retaining member 1402, and interlocks retaining member 1401 and retaining member 1402. The retaining member 1403 can rotate about a pivot 1403b as a center.

When the retaining member 1403 changes from a locked state to an unlocked state, the retaining member 1403, with the pivot 1403b as a center, rotates in the direction indicated by arrow 1600B in FIG. 16. Further, when the retaining member 1403 changes from an unlocked state, the retaining member 1403, with the pivot 1403b as a center, rotates in the direction indicated by arrow 1700B in FIG. 17. The retaining member 1401 and the retaining member 1402, accompanying the rotation of the retaining member 1403 about the pivot 1403b, slide in the insertion/removal direction of the anti-vibration unit 103.

The retaining member 1403 includes an operation receiving portion 1403a that protrudes outside the casing 104. Disposal of the operation receiving portion 1403a enables the retaining member 1403 to be rotated from outside the casing 104 to interlock the retaining members 1401 and 1402, and facilitates switching between the locked state and the unlocked state (free state) of the movable vibration-correcting lens 102a.

To rotate the operation receiving portion 1403a and stably maintain the locked state or the unlocked state of the movable vibration-correcting lens 102a, maintenance of the rotation position of the retaining member 1403 near either end of the range of rotation for the retaining member 1403 to be in the locked state or the unlocked state is not particularly illustrated; however, for example, the operation receiving portion 1403a has a protruding portion protruding to the side of a through hole that the operation receiving portion 1403a is disposed on, the through hole being formed between the anti-vibration unit outer-frame 302 and the anti-vibration unit cover 303, and passing to outside the casing 104. Near either end of the range of rotation of the retaining member 1403, the operation receiving portion 1403a may be engaged with the protruding portion, fit into the through hole and locked. Further, this is but one example and provided that a locked state or an unlocked state can be stably maintained, configuration is not limited.

The operation receiving portion 1403a , fixing the anti-vibration unit 103 in the lens barrel 101, protrudes to outside the casing 104 and lens barrel 101. Thus, when the anti-vibration unit 103 in an independent state or is mounted in the lens barrel 101, the retaining member 1403 can be rotated, by manual operation without using a drive circuit, to interlock the retaining members 1401 and 1402.

When various types of data (anti-vibration correction data) are acquired, for example, a technician executing acquisition work for the data (anti-vibration correction data) grasps the operation receiving portion 1403a by hand, rotates the retaining member 1403 and puts the movable vibration-correcting lens 102a in a locked state. The position of the movable vibration-correcting lens 102a is then fixed and with the properties of the anti-vibration unit 103 in a stable state, the technician performs measurements to obtain various types of data (anti-vibration correction data).

In this way, the locking mechanism 1400 enables switching between locked and unlocked states of the movable vibration-correcting lens 102a without consuming power. As a result, to position the movable vibration-correcting lens 102a at a neutral position, various types of data (anti-vibration correction data) concerning the anti-vibration unit 103 may be collected without mounting the anti-vibration unit 103 in the lens barrel 101 or using a circuit to pass current through the anti-vibration unit 103.

Further, when the movable vibration-correcting lens 102a is configured to be housed in the anti-vibration unit 103, which is insertable to and removable from the lens barrel 101, even when the anti-vibration unit 103 is independent of (not inserted in) the lens barrel 101, the movable vibration-correcting lens 102a is stably fixed at a neutral position of the mechanism in the anti-vibration unit 103, manually without the use of a drive circuit, etc.

With the locking mechanism 1400, switching between locked and unlocked states of the movable vibration-correcting lens 102a may be performed electrically by interlocking to the operation receiving portion 1403a, an actuator for rotating the retaining member 1403.

Figure 18:
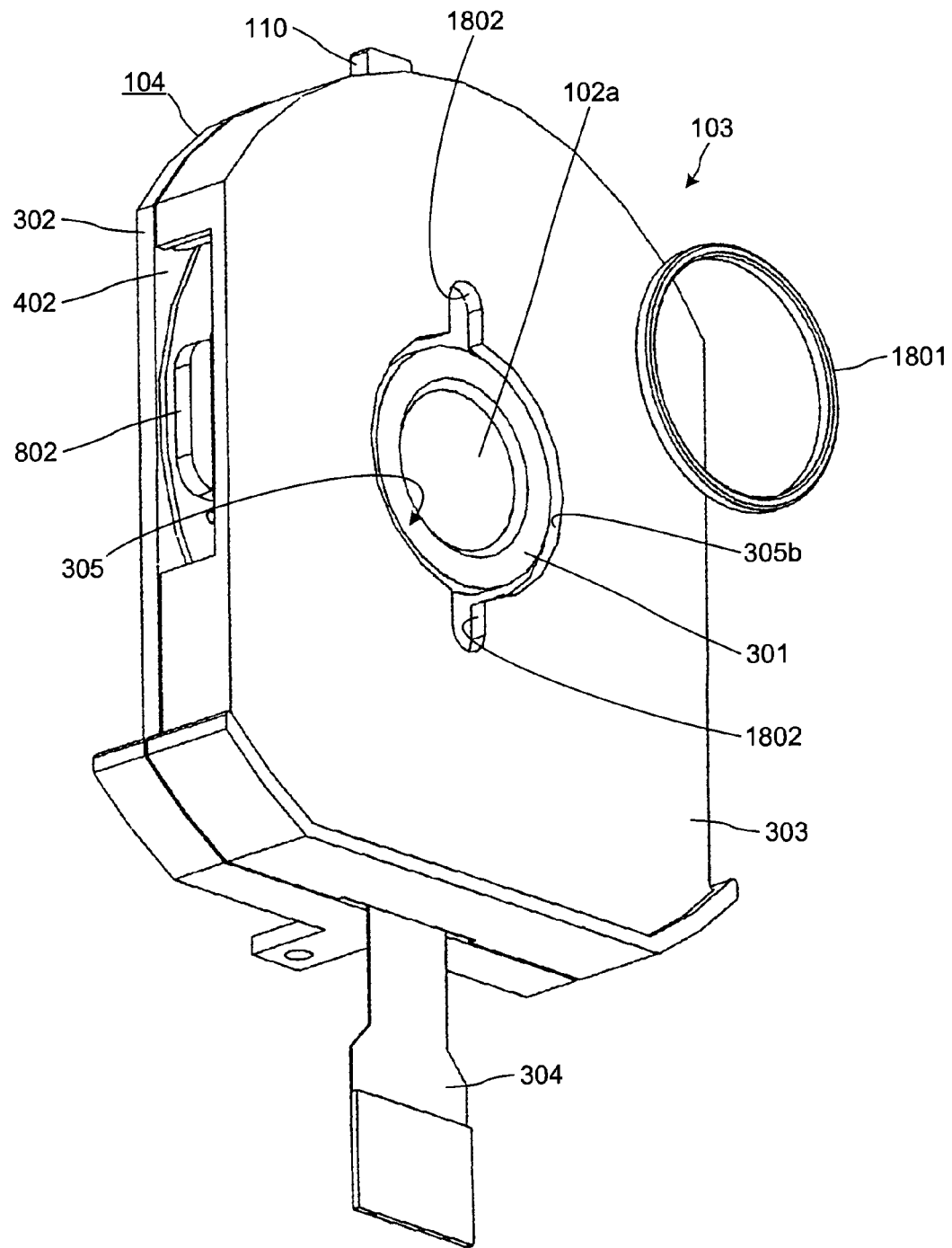
FIGS. 18, 19, and 20 are schematics of another example of the locking mechanism of the movable vibration-correcting lens.
Figure 19:
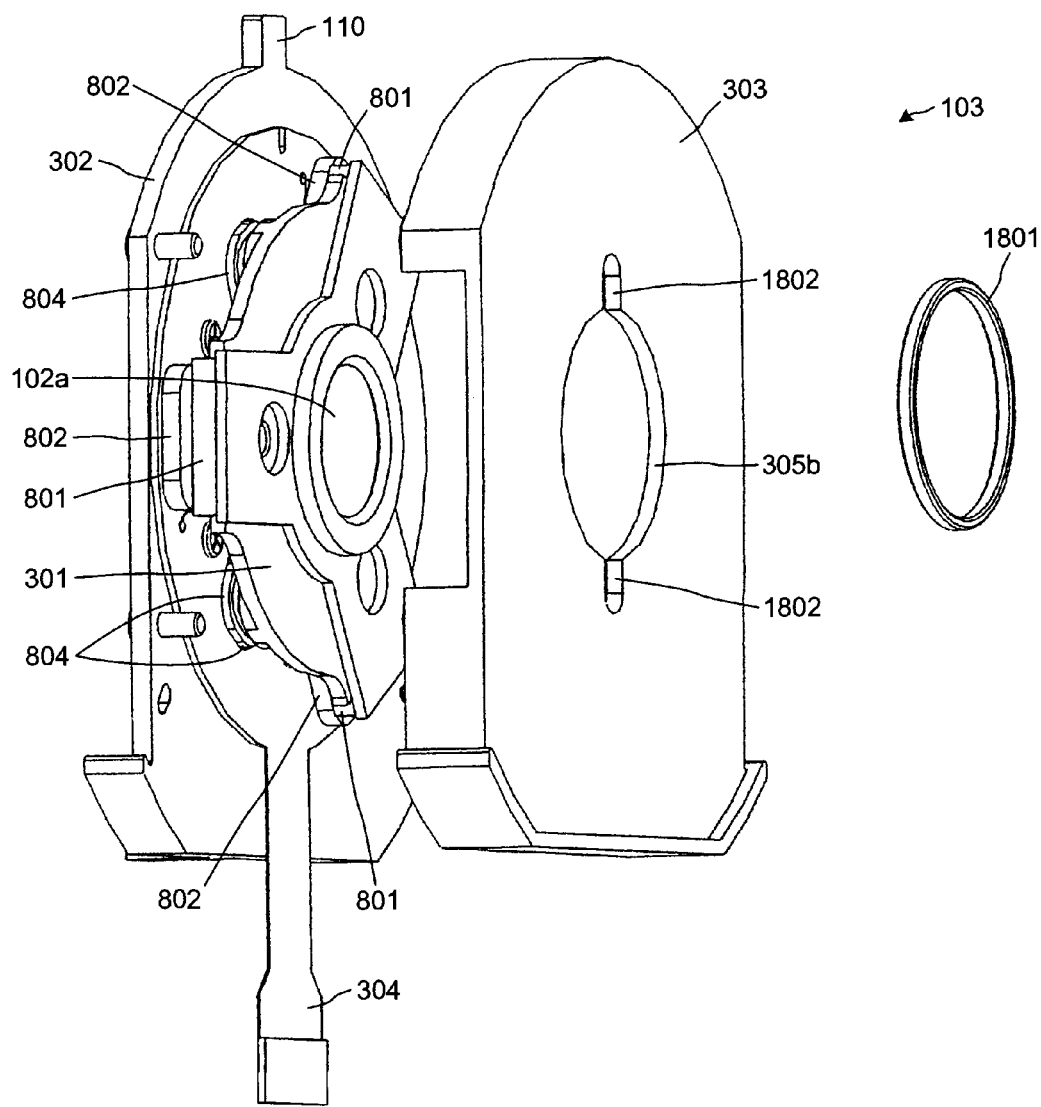
Figure 20:
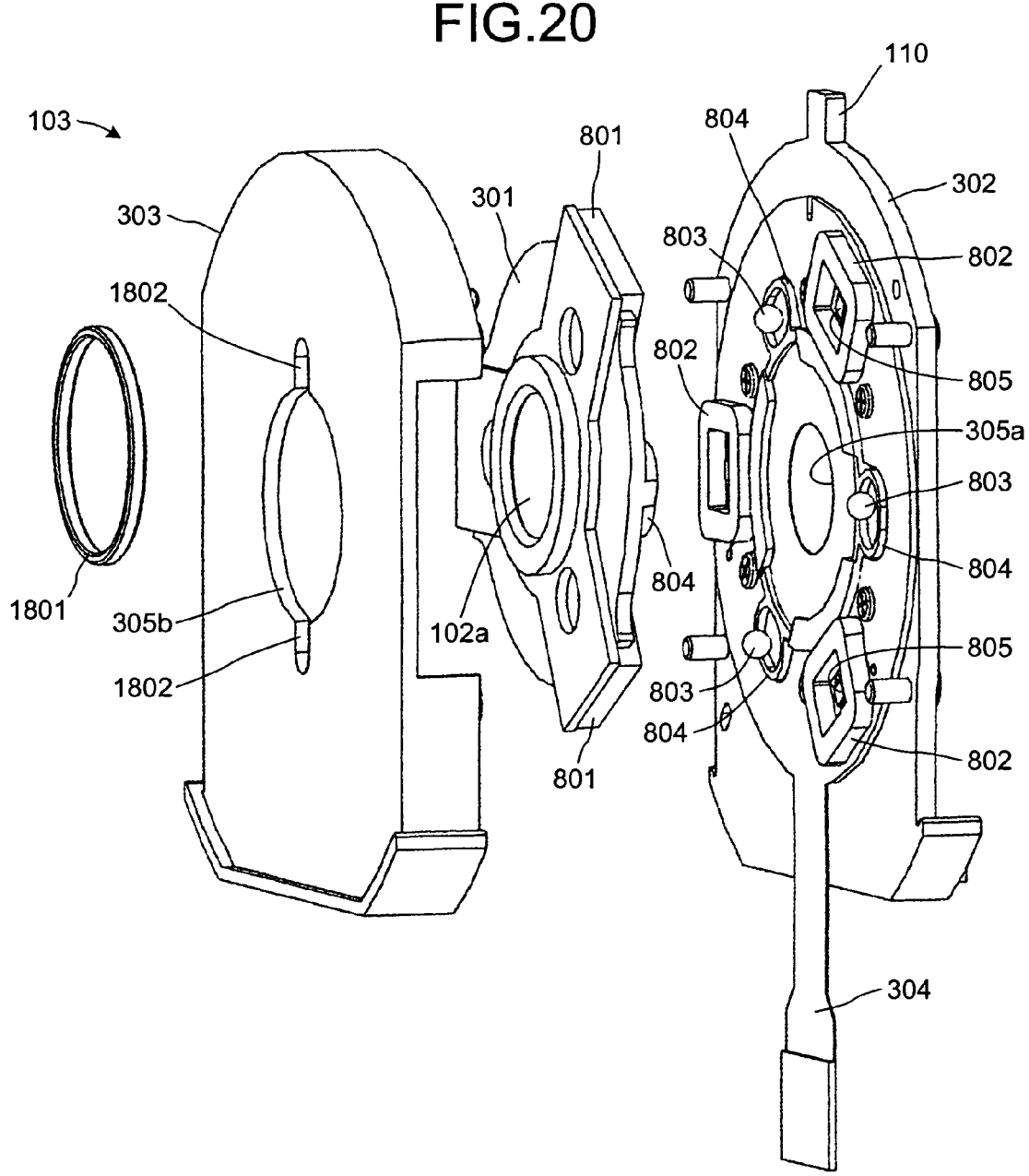

FIGS. 18, 19, and 20 are schematics of another example of the locking mechanism of the movable vibration-correcting lens 102a.

As depicted in FIGS. 18, 19, and 20, the locking mechanism of the movable vibration-correcting lens 102a may be implemented by attaching a retaining member 1801 to the casing 104 of the anti-vibration unit 103 such that the retaining member 1801 is detachable. The retaining member 1801 has an inner diameter that is equivalent to an external dimension of the movable vibration-correcting lens 102a, the external dimension of the movable vibration-correcting lens 102a having a ring shape equivalent to the inner diameter of the opening 305b provided in the anti-vibration unit cover 303.

The anti-vibration unit 103 is in a locked state when the retaining member 1801 is fitted between the outer edge of the movable vibration-correcting lens 102a and inner periphery of the opening 305b. Further, the anti-vibration unit 103 is in an unlocked state when the retaining member 1801 is removed from between the outer edge of the movable vibration-correcting lens 102a and the inner periphery of the opening 305b.

The opening 305b is provided with notches 1802 for removing the retaining member 1801. The notches 1802 are continuous with the opening 305b, and with the opening 305b in between, oppose each other along the insertion/removal direction.

When the anti-vibration unit 103 is in a locked state by retaining member 1801 and is to be unlocked, pincers or the like are inserted into the notches 1802 to grasp and removed the retaining member 1801. Alternatively, to unlock the anti-vibration unit 103 from a locked state, a rod-shaped member having a narrowed end may be inserted into the notches 1802 and the narrowed end may be used to pry out the retaining member 1801. Switching between locked and unlocked states in the anti-vibration unit 103 employing the retaining member 1801 is simple and easy.

As described, the anti-vibration unit 103 as one example of the image stabilizing apparatus according to the embodiment constitutes a part of the imaging lenses 102, which is one example of an optical system, and includes the movable vibration-correcting lens 102a that can be moved along a direction orthogonal to the optical axis, the locking mechanism 1400 as one example of a locking unit that fixes the movable vibration-correcting lens 102a at a neutral position substantially coinciding with the optical axis of the optical system, and the retaining member 1403 as one example of an actuating unit that switches between a locked state where the movable vibration-correcting lens 102a is fixed by the locking mechanism 1400 and an unlocked state where the movable vibration-correcting lens 102a is not fixed. Further, the locking mechanism 1400 is implemented by the retaining members 1401 and 1402 provided with the retaining arms 1401a and 1402a, which are one example of a retaining unit that has therebetween the movable vibration-correcting lens 102a and slides in the insertion/removal direction. The retaining member 1403 switches between locked and unlocked states by causing the retaining arms 1401a and 1402a to sandwich the movable vibration-correcting lens 102a and by mutually moving the retaining members 1401 and 1402 in opposing directions.

According to the embodiment, the movable vibration-correcting lens 102a is easily maintained at a neutral position of the mechanism in the anti-vibration unit 103 by a simple configuration without power consumption for the passage of current. Further, according to the embodiment, the movable vibration-correcting lens 102a can be maintained at a neutral position of the mechanism in the anti-vibration unit 103, from outside the anti-vibration unit 103.

According to the embodiment, since the casing 104 of the anti-vibration unit 103 is provided with the protective opening 104a and at least a portion of the imaging lens 102b or a portion of the lens frame supporting the imaging lens 102b is inserted in the protective opening 104a, the imaging lens 102b and the anti-vibration unit 103 partially overlap along the direction of the optical axis. As a result, the size of the lens unit 100 can be reduced.

According to the embodiment, the anti-vibration unit 103 includes the retaining arms 1401a and 1402a that include, on a side facing the movable vibration-correcting lens 102a, the recessed portions 1401b and 1402b that recede from the movable vibration-correcting lens 102a and include the oblique portions 1401c and 1402c that abut the movable vibration-correcting lens 102a and are slanted with respect to the insertion/removal direction in an expanding manner on the movable vibration-correcting lens 102a side.

According to the embodiment, even when the movable vibration-correcting lens 102a has been displaced from the neutral position, by merely sliding the retaining members 1401 and 1402 so that the retaining arms 1401a and 1402a sandwich the movable vibration-correcting lens 102a, the movable vibration-correcting lens 102a is maintained at the neutral position of the mechanism in the anti-vibration unit 103.

The anti-vibration unit 103 according to the embodiment includes the casing 104 that houses the retaining arms 1401a and 1402a, the movable vibration-correcting lens 102a, the anti-vibration unit outer-frame 302, the retaining members 1401, 1402, and 1403.

According to the embodiment, the retaining arms 1401a and 1402a are housed with the movable vibration-correcting lens 102a, the anti-vibration unit outer-frame 302, the retaining members 1401 and 1402, and the retaining member 1403 in the casing 104 as a unit and thus, the handlability of the anti-vibration unit 103 is improved, and insertion and removal of the anti-vibration unit 103 with respect to the lens barrel 101 is facilitated.

In the anti-vibration unit 103 according to the embodiment, the retaining member 1403 is disposed to protrude outside the lens barrel 101, which has therein the imaging lenses 102, and includes the operation receiving portion 1403a, which by manual operation, switches between locked and unlocked states. According to the embodiment, through manual operation of the operation receiving portion 1403a from outside the casing 104 and the lens barrel 101, the retaining member 1403 is rotated to interlock the retaining members 1401 and 1402 without the use of a drive circuit, etc.

The lens unit 100 as one example of the lens apparatus according to the embodiment includes the lens barrel 101 and the anti-vibration unit 103 that can be inserted to and removed from the lens barrel 101 along a direction orthogonal to the optical axis, the lens barrel 101 and the anti-vibration unit 103 being included in an optical system.

According to the embodiment, the anti-vibration unit 103 is insertable to and removable from the lens barrel 101 and thus, the anti-vibration unit 103 alone is replaceable in the lens unit 100. As a result, if performance is, for example, below that demanded of the lens unit 100 or has deteriorated, appropriate replacement of the anti-vibration unit 103 enables the performance demanded of the lens unit 100 to be easily maintained.

Consequently, since components in the lens unit 100 other than the anti-vibration unit 103 can be standardized while easily meeting the demanded performance of each lens unit 100, quality assurance for the lens unit 100 and reduced manufacturing cost are facilitated.

The imaging apparatus according to the embodiment includes the lens unit 100 and an imaging element that receives light transmitted through the lens unit 100. According to the embodiment, for each imaging apparatus, demanded performance and quality can be assured, and the lens unit 100 having reduced manufacturing cost can be used. Consequently, an imaging apparatus can be achieved, for which demanded performance and quality are assured and for which manufacturing cost is reduced.

As described, the lens unit 100, as one example of the lens apparatus according to the embodiment, includes as one example of optical components of the optical system, the lens barrel 101 that includes the imaging lenses 102, the movable vibration-correcting lens 102a that can be moved along a direction orthogonal to the optical axis and constitutes a part of the optical system, the casing 104 housing the movable vibration-correcting lens 102a, the anti-vibration unit 103 that by sliding along the direction (insertion/removal direction) orthogonal to the optical axis, can be inserted to and removed from the lens barrel 101, and the protective opening 104a as one example of a housing unit that is provided in the casing 104 and houses at least a portion of the imaging lens 102b such that at least a portion of the imaging lens 102b, which is an example of an optical component that constitutes a part of the optical system and is adjacent to the anti-vibration unit 103 along the direction of the optical axis, overlaps the anti-vibration unit 103 along the direction of the optical axis.

According to the lens unit 100, the size of the lens unit 100 realizing an anti-vibration correction function, particularly, a dimension along the direction of the optical axis can be reduced (made shorter). Further, through the reduction in the size of the lens unit 100, the size of an imaging apparatus equipped with the lens unit 100 can be reduced (made shorter).

The protective opening 104a in the lens unit 100 is not limited to a configuration in which at least a portion of imaging lens 102b and the anti-vibration unit 103 overlap along the direction of the optical axis. For example, the protective opening 104a may be configured to house at least a portion of the imaging lens 102b such that at least a portion of the lens frame supporting the imaging lens 102b, which is one example of a lens frame, and the anti-vibration unit 103 overlap along the direction of the optical axis.

In the lens unit 100, by making the imaging lens 102b a focusing lens that is movable along the direction of the optical axis when an image is captured (e.g., in a state when an image can be captured) to adjust the focal point of the optical system, the imaging lens 102b and the anti-vibration unit 103 can be partially overlapped along the direction of the optical axis, without additionally configuring the imaging lens 102b to be movable along the direction of the optical axis in order to overlap the imaging lens 102b and the anti-vibration unit 103, along the direction of the optical axis, since the focusing lens is already configured to be movable. The imaging lens 102b is not limited to the focusing lens and for example, may be a zoom lens which is movable along the direction of the optical axis to obtain different focal lengths.

Thus, the size of the lens unit 100, which controls the complexity of the configuration by utilizing the original configuration and implements an anti-vibration correction function, can be reduced, particularly a dimension along the direction of the optical axis. By reducing the size of the lens unit 100, the size of an imaging apparatus equipped with the lens unit 100 can be reduced.

The lens unit 100 includes, in the optical system, the lens barrel 101 and the anti-vibration unit 103 that can be inserted to and removed from the lens barrel 101 along a direction orthogonal to the optical axis, and since the anti-vibration unit 103 can be inserted to and removed from the lens barrel 101, the anti-vibration unit 103 alone can be replaced in the lens unit 100.

As a result, if performance is, for example, below that demanded of the lens unit 100 or has deteriorated, appropriate replacement of the anti-vibration unit 103 enables the performance demanded of the lens unit 100 to be easily maintained.

Consequently, since components in the lens unit 100 other than the anti-vibration unit 103 can be standardized while easily meeting the demanded performance of each lens unit 100, quality assurance for the lens unit 100 and reduced manufacturing cost are facilitated.

The imaging apparatus according to the embodiment includes the lens unit 100 and an imaging element that receives light transmitted through the lens unit 100. The imaging apparatus according to the embodiment utilizes the lens unit 100 having a reduced size. Consequently, the size of the imaging apparatus can be reduced.

As described, the correction optical apparatus according to the invention includes a movable lens unit that includes a casing formed in a planar shape having a thin thickness in a longitudinal direction, a movable lens housed in the casing and movable along a planar direction of the casing, a drive unit that moves the movable lens, a locking unit that is disposed to be manually operable from outside the casing and is able to fix the movable lens housed in the casing of the movable lens unit, at a given position with respect to the casing.

Such a correction optical apparatus includes, for example, the locking mechanism depicted in FIGS. 14 to 17 or that depicted in FIG. 18. Through such a configuration, even when the movable lens is separate, the movable lens can be fixed with respect to the casing without an electrical connection.

The correction optical apparatus according to the present invention is configured such that in the casing, the opening is formed at a position facing the movable lens, the locking unit is implemented by the retaining member disposed to be detachable with respect to the casing, and the retaining member fits in an interstice formed between the opening and the movable lens to fix the movable lens in a locked state.

The locking unit of such a correction optical apparatus is implemented by, for example, the example of the locking mechanism depicted in FIGS. 18 to 20. Through such a configuration, even when the movable lens unit is separate, the movable lens unit can be fixed with respect to the casing by a simple configuration.

Further, the correction optical apparatus according to the invention includes an actuating unit that switches between the locked state in which the movable lens is fixed by the locking unit and the unlocked state in which the movable lens is released from the locked state. The locking unit is disposed in the casing and includes the two retaining members that include the retaining unit sandwiching the correcting lens and that are disposed to slide along a panel. The actuating unit is configured to switch between the locked and unlocked states by moving the two retaining members with the retaining unit sandwiching the movable lens in opposing directions.

Such a correction optical apparatus may be implemented by, for example, the example of the locking mechanism depicted in FIGS. 14 to 17. Through such configuration, even if the movable lens unit is separate, the movable lens unit can be fixed with respect to the casing by a simple configuration.

In the correction optical apparatus according to the invention, the movable lens unit includes the data storage unit storing therein various types of data unique to a movable lens unit in a state when the movable lens is fixed at a given position by the locking unit.

Such a correction optical apparatus may be implemented by, for example, the configuration depicted as an example in FIG. 10. Through such a configuration, even if the movable lens unit is separate, data specific to the movable lens when fixed at a given position with respect to the casing, can be easily acquired.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image stabilizing apparatus comprising:
   an image-shake correcting lens constituting a part of an optical system and movable along a direction orthogonal to an optical axis of the optical system;
   a locking unit configured to fix the image-shake correcting lens at a position substantially coinciding with the optical axis of the optical system; and
   an actuating unit configured to switch between a locked state where the image-shake correcting lens is fixed by the locking unit and an unlocked state where the locked state of the image-shake correcting lens is released,
   wherein the locking unit includes retaining members configured to sandwich the image-shake correcting lens and arranged to slide along the direction orthogonal to the optical axis, and
   wherein the actuating unit is configured to switch between the locked state and the unlocked state by moving the retaining members in opposing directions.

2. The image stabilizing apparatus according to claim 1, wherein the retaining members have recessed portions facing the image-shake correcting lens, wherein the recessed portions recede from the image-shake correcting lens to form a recessed shape and have oblique portions that are within a plane orthogonal to the optical axis, and wherein the oblique portions are slanted with respect to the direction orthogonal to the optical axis and are configured to abut the image-shake correcting lens.

3. The image stabilizing apparatus according to claim 1, further comprising a casing that houses the image-shake correcting lens, the locking unit, and the actuating unit.

4. The image stabilizing apparatus according to claim 1, wherein the actuating unit includes an operation receiving portion that protrudes outside a lens barrel housing the optical system, and wherein the operation receiving portion is configured to switch between the locked state and the unlocked state by manual operation.

5. A lens apparatus comprising:
   the image stabilizing apparatus according to claim 1,
   a lens barrel housing the optical system,
   wherein the image stabilizing apparatus is configured to be insertable into and removable from the lens barrel along the direction orthogonal to the optical axis.

6. An imaging apparatus comprising:
   the lens apparatus according to claim 5; and
   an imaging element configured to receive light transmitted through the lens apparatus.

7. A lens apparatus comprising:
   a lens barrel housing an optical component constituting part of an optical system;
   an image stabilizing unit configured to slide along a direction orthogonal to an optical axis so as to be inserted and removed with respect to the lens barrel, the image stabilizing unit comprising an image-shake correcting lens movable along the direction orthogonal to the optical axis and constituting part of the optical system; and
   a casing housing the image-shake correcting lens;
   wherein the casing includes a housing unit that houses at least (a) a portion of the optical component adjacent to the image stabilizing unit, the portion being movable along the optical axis, or (b) a portion of a support member supporting the optical component.

8. The lens apparatus according to claim 7, wherein the optical component adjacent to the image stabilizing unit is another lens movable along the optical axis when an image is captured.

9. An imaging apparatus comprising:
   the lens apparatus according to claim 6;
   an imaging element configured to receive light transmitted through the lens apparatus.

10. A correction optical apparatus comprising:
    a movable lens unit that includes:
       a casing formed in a planar shape having a thin thickness,
       a movable lens housed in the casing and movable along a planar direction of the casing, and
       a drive unit that is housed in the casing, arranged along a planar aspect of the casing, and is configured to move the movable lens; and
    a locking unit that is configured to be operated from outside the casing and without current being passed to fix the movable lens at a given position with respect to the casing.

11. The correction optical apparatus according to claim 10, wherein the casing is provided with an opening at a position facing the movable lens,
    wherein the locking unit is formed by a retaining member that is attachable and detachable with respect to the casing, and
    wherein the retaining member fits in an interstice formed between the opening and the movable lens so as to be configured to fix the movable lens in a locked state.

12. The correction optical apparatus according to claim 10, further comprising an actuating unit configured to switch between a locked state of the movable lens where the movable lens is fixed by the locking unit and an unlocked state where the locked state of the movable lens is released,
    wherein the locking unit is provided in the casing and includes retaining members sandwiching the movable lens,
    wherein the retaining members are configured to slide along a panel, and
    wherein the actuating unit is configured to switch between the locked state and the unlocked state by moving the retaining members in opposing directions.

13. A lens apparatus comprising:
    a lens barrel housing an optical system; and the correction optical apparatus according to claim 10,
wherein the correction optical apparatus is insertable into and removable from the lens barrel along a direction orthogonal to an optical axis.

14. A correction optical apparatus comprising:

a movable lens unit that includes:
- a casing formed in a planar shape having a thin thickness,
- a movable lens housed in the casing and movable along a planar direction of the casing, and
- a drive unit that is housed in the casing, arranged along a planar aspect of the casing, and configured to move the movable lens; and a locking unit that is configured to be operated from outside the casing and configured to fix the movable lens at a given position with respect to the casing, wherein the movable lens unit includes a data storage unit storing therein various types of data specific to the movable lens unit when the movable lens is fixed at the given position by the locking unit.

* * * * *